(12) United States Patent
Zhang et al.

(10) Patent No.: US 10,969,783 B2
(45) Date of Patent: Apr. 6, 2021

(54) TIME SOURCE RANKING SYSTEM FOR AN AUTONOMOUS DRIVING VEHICLE

(71) Applicant: Baidu USA LLC, Sunnyvale, CA (US)

(72) Inventors: Manjiang Zhang, Sunnyvale, CA (US); Xiangtao You, Sunnyvale, CA (US); Oh Kwan, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 107 days.

(21) Appl. No.: 16/112,251

(22) Filed: Aug. 24, 2018

(65) Prior Publication Data
US 2020/0064836 A1 Feb. 27, 2020

(51) Int. Cl.
*G05D 1/02* (2020.01)
*G05D 1/00* (2006.01)
*G06F 1/14* (2006.01)

(52) U.S. Cl.
CPC .......... *G05D 1/0088* (2013.01); *G05D 1/028* (2013.01); *G05D 1/0278* (2013.01); *G05D 1/0285* (2013.01); *G06F 1/14* (2013.01)

(58) Field of Classification Search
CPC .... G05D 1/0088; G05D 1/0278; G05D 1/028; G05D 1/0285; G06F 1/14; H04Q 9/04; H04J 3/0667
USPC ......................................................... 701/27
See application file for complete search history.

(56) References Cited

U.S. PATENT DOCUMENTS

| | | | | |
|---|---|---|---|---|
| 2010/0321118 A1* | 12/2010 | Smiley | .................... | H03L 7/087 331/18 |
| 2017/0238270 A1* | 8/2017 | Shen | .................... | H04W 56/00 370/336 |
| 2018/0088584 A1 | 3/2018 | Tascione et al. | | |

FOREIGN PATENT DOCUMENTS

| | | |
|---|---|---|
| CN | 107819799 A | 3/2018 |
| EP | 3323690 A1 | 5/2018 |
| JP | 2002090441 A | 3/2002 |
| JP | 2008230467 A | 10/2008 |

* cited by examiner

*Primary Examiner* — Nadeem Odeh
(74) *Attorney, Agent, or Firm* — Womble Bond Dickinson (US) LLP

(57) ABSTRACT

In one embodiment, a system receives a number of times from a number of time sources including sensors and real-time clocks (RTCs), wherein the sensors are in communication with an autonomous driving vehicle (ADV) and the sensors include at least a GPS sensor. The system generates a difference histogram based on a time for each of the time sources for a difference between a time of the GPS sensor and a time for each of the other sensors and RTCs. The system ranks the sensors and RTCs based on the difference histogram. The system selects a time source from one of the sensors or RTCs with a least difference in time with respect to the GPS sensor. The system generates a timestamp based on the selected time source to timestamp sensor data for a sensor unit of the ADV.

18 Claims, 19 Drawing Sheets

400

| Application 401 | Planning and Control 402 | Perception 403 | Device Driver(s) 404 | Firmware 405 | Hardware 406 |

FIG. 4

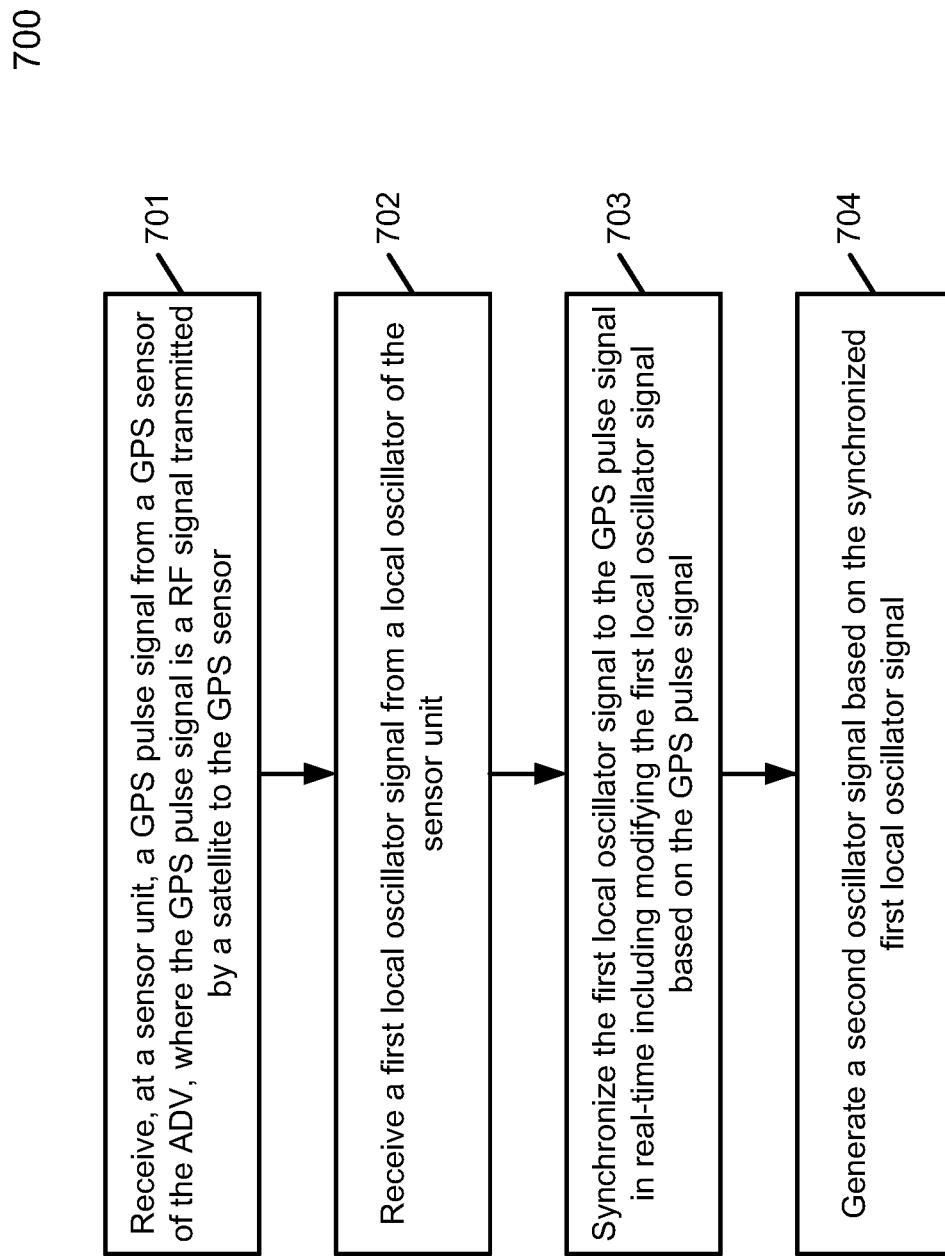

TIME SOURCE RANKING SYSTEM FOR AN AUTONOMOUS DRIVING VEHICLE

TECHNICAL FIELD

Embodiments of the present disclosure relate generally to operating autonomous vehicles. More particularly, embodiments of the disclosure relate to a time source ranking system for an autonomous driving vehicle.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. The accuracy and efficiency of the motion planning and control depends heavily on the accuracy of a time of the vehicle to time stamp and synchronize different sensor inputs for the vehicle. Conventionally, a time can be generated using high precision crystal oscillators which can be costly and may not be available for different sensors and devices. Furthermore, time generation from more than one clock source of sensors and devices may be confusing and imprecise.

BRIEF DESCRIPTION OF THE DRAWINGS

Embodiments of the disclosure are illustrated by way of example and not limitation in the figures of the accompanying drawings in which like references indicate similar elements.

FIG. 4 is a block diagram illustrating architecture of an autonomous driving system according to one embodiment.

FIG. 7 is a flow diagram of a method to generate a time according to one embodiment.

DETAILED DESCRIPTION

Figure 1:
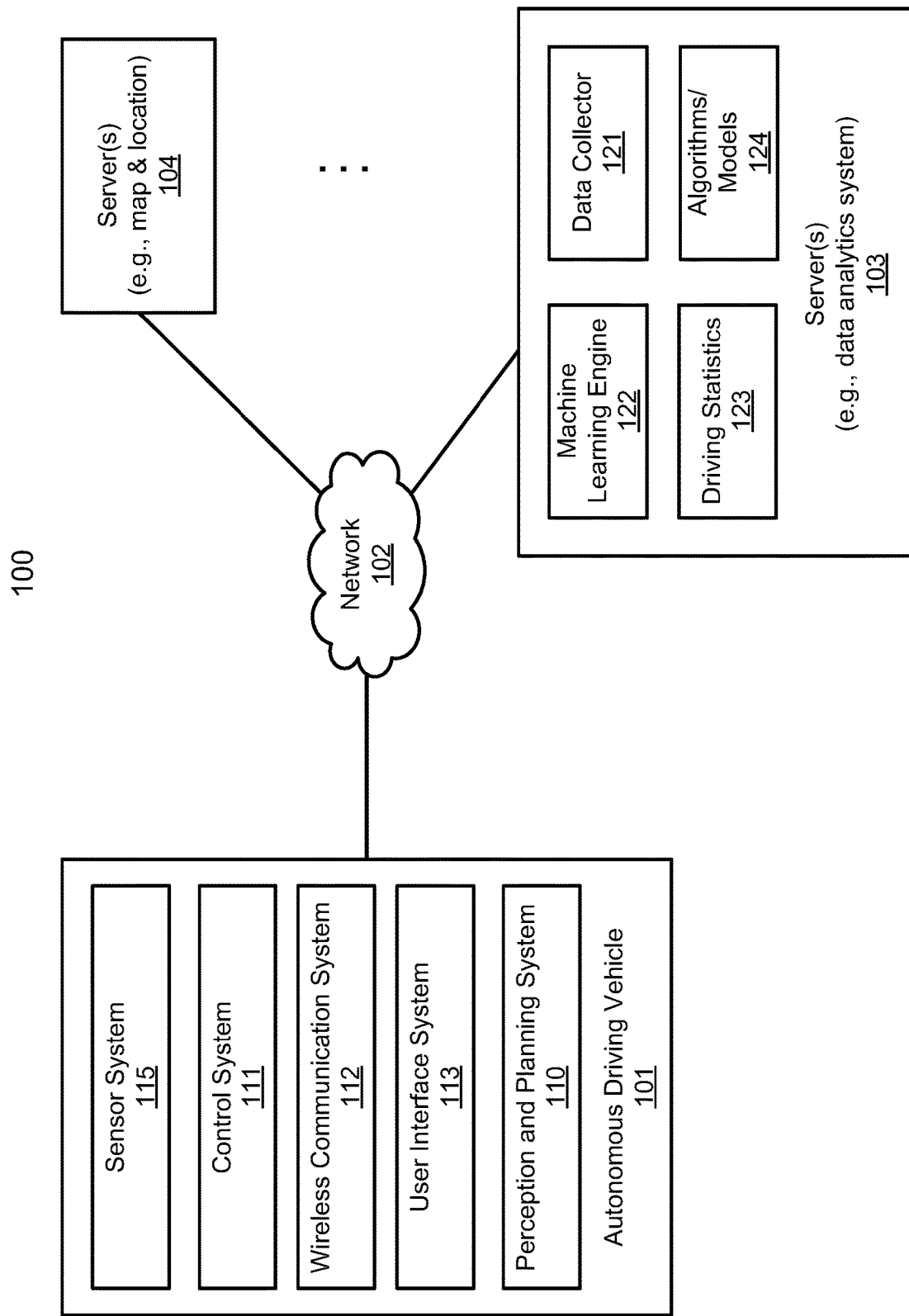
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

A real-time clock (RTC) is a computer clock that keeps track of time. RTCs are present in almost any electronic device which needs to keep accurate time. Most RTCs use a crystal oscillator such as a quartz crystal. A crystal oscillator is an electronic oscillator integrated circuit (IC) which is used for the mechanical resonance of a vibrating crystal of piezoelectric material. It will create an electrical signal with a given frequency. RTC ICs can vary in accuracy up to 100 parts per million (PPM) and RTC ICs having a higher accuracy tend to cost more. Because RTC ICs vary in accuracy, e.g., counting time at slightly different rates, even when initially set accurate, RTCs will differ after some time due to clock drift.

According to one aspect, a time generation system receives, at a sensor unit, a global positioning system (GPS) pulse signal from a GPS sensor of an autonomous driving vehicle (ADV), where the GPS pulse signal is a RF signal transmitted by a satellite to the GPS sensor, where the sensor unit is coupled to a plurality of sensors mounted on the ADV and a host system, where the host system includes a perception module and a planning and control (PNC) module, where the perception module is to perceive a driving environment surrounding the ADV based on sensor data obtained from the sensors and processed by a processing module of the sensor unit, and where the PNC module is to plan a path to autonomously drive the ADV based on perception data. The system receives a first local oscillator signal from a local oscillator of the sensor unit. The system synchronizes the first local oscillator signal to the GPS pulse signal in real-time, including modifying the first local oscillator signal based on the GPS pulse signal. The system generates a second oscillator signal based on the synchronized first local oscillator signal, where the second oscillator signal is used to provide a time to at least one of the sensors.

In one embodiment, the system generates a first counter having a first granularity using the local oscillator. The system monitors the first counter to count a number of oscillations at the first granularity to reach a time interval of the GPS pulse signal, where each count represents an oscillation at the first granularity. The system calculates a first count value based on the monitored first counter at the first granularity. The system modifies the first counter so that each count represents a fraction of an oscillation at the first granularity based on the calculated first count value to synchronize the local oscillator at the first granularity.

In another embodiment, the system generates a second counter having a second granularity using the local oscillator. The system monitors the second counter to count a number of oscillations at the second granularity to reach a time interval of the GPS pulse signal, where each count represents an oscillation at the second granularity. The system calculates a second count value based on the monitored second counter at the second granularity. The system modifies the second counter so that each count represents a fraction of an oscillation at the second granularity based on the calculated second count value to synchronize the local oscillator at the second granularity.

In another embodiment, the system generates a third counter having a third granularity using the local oscillator. The system monitors the third counter to count a number of oscillations at the third granularity to reach a time interval of the GPS pulse signal, where each count represents an oscillation at the third granularity. The system calculates a third count value based on the monitored third counter at the third granularity. The system modifies the third counter so that each count represents a fraction of an oscillation at the third granularity based on the calculated third count value to synchronize the local oscillator at the third granularity.

In another embodiment, the first granularity is a millisecond granularity, the second granularity is a microsecond granularity, and the third granularity is a nanosecond granularity. In another embodiment, the system disables the generation of any of the first, second, or the third counters for synchronization. In another embodiment, the system maintains the first, second, and third count values if the GPS sensor signal is lost, until the GPS sensor signal is again regained.

According to a second aspect, a sensor unit is to be utilized in an ADV. The sensor unit includes a sensor interface to be coupled to a number of sensors mounted on a number of locations of the ADV. The sensor unit includes a host interface to be coupled to a host system, where the host system is configured to perceive a driving environment surrounding the ADV based on sensor data obtained from the sensors and to plan a path to autonomously drive the ADV. The sensor unit includes a time synchronization hub device coupled to the sensor interface. The time synchronization hub device includes one or more transmit (TX) timestamp generators coupled to a time source, where the TX timestamp generators generate TX timestamps based on a time obtained from the time source to provide the TX timestamps to one or more of the sensors indicating a time the sensors transmit sensor data to the host system via the host interface. The time synchronization hub device includes one or more receive (RX) timestamp generators coupled to the time source, where the RX timestamp generators generate RX timestamps based on the time obtained from the time source to provide the RX timestamps to the one or more of the sensors indicating a time when sensor data is received from the sensors.

In one embodiment, a first of the sensors (e.g., a sensor that accepts time information input and outputs sensor data with time information) is coupled to both a TX timestamp generator and a RX timestamp generator, where the sensor is to receive a TX timestamp from the TX timestamp generator and transmits sensor data and a metadata to the circuit, where the metadata includes the TX timestamp information, where the RX timestamp generator is to generate a RX timestamp to append to the transmitted metadata to indicate a time when the sensor data is received by the circuit.

In one embodiment, a second of the sensors (e.g., a sensor that may or may not accept time information inputs and outputs only sensor data) is coupled to an RX timestamp generator but not a TX timestamp generator, where the sensor is to transmit sensor data to the circuit without any transmit timestamp information, and where the RX timestamp generator is to generate a RX timestamp to append to a metadata of the transmitted sensor data to indicate a time when the sensor data is received by the circuit.

In one embodiment, a third of the sensors (e.g., a sensor that accepts time information inputs and outputs directly to a host system) is coupled to a TX timestamp generator and the host system but not a RX timestamp generator, where the sensor is to receive a TX timestamp from the TX timestamp generator and the third sensor transmits sensor data and metadata directly to the host system, where the metadata includes TX timestamp information indicating a time when the sensor data is transmitted to the host system.

In one embodiment, the synchronization hub device is coupled to the host system to synchronize a time of the host system. In another embodiment, the synchronization hub device is coupled to the host system via a peripheral component interconnect express (PCIe) bus.

In one embodiment, a metadata for a camera sensor coupled to a TX timestamp generator includes camera trigger timestamp information. In one embodiment, a timestamp format of the TX or RX timestamps includes a ms:µs:ns:mm:ss:hh:month:day:year or a mm:ss:hh:month:day:year format. In another embodiment, the sensor unit includes a format converter unit to convert a timestamp from one format to another.

According to a third aspect, a system receives a number of times from a number of time sources including sensors and real-time clocks (RTCs), wherein the sensors are in communication with the ADV and the sensors include at least a GPS sensor, and where the RTCs include at least a central processing unit real-time clock (CPU-RTC). The system generating a difference histogram based on a time for each of the time sources for a difference between a time of the GPS sensor and a time for each of the other sensors and RTCs. The system ranks the sensors and RTCs based on the difference histogram. The system selects a time source from one of the sensors or RTCs with a least difference in time with respect to the GPS sensor. The system generates a timestamp based on the selected time source to timestamp sensor data for a sensor unit of the ADV.

In one embodiment, the difference histogram includes an average difference histogram comprising an average time difference distribution for the GPS sensors and each of the other sensors and RTCs. In one embodiment, the system defaults to a default list of ranking for sensors or RTCs when a difference histogram is unavailable.

In one embodiment, the system stores time information of the CPU-RTC to a log file including a time difference of a time for the CPU-RTC and the GPS sensor. The system monitors the time difference of a time for the CPU-RTC and the GPS sensor. The system updates time information in the log file based on the monitored time difference. In one embodiment, the time sources include: LTE, WIFI, CPU RTC, FPGA RTC, FM receiver, V2X sensors, or GPS sensors. In one embodiment, the system logs the difference histogram and rankings of the sensors and RTCs to a log buffer.

According to a fourth aspect, a system determines a difference in time between a local time source and a time of a GPS sensor. The system determines a max limit in difference and a max recovery increment or max recovery time interval for a smooth time source recovery. The system determines that the difference between the local time source and a time of the GPS sensor to be less than the max limit. The system plans a smooth recovery of the time source to converge (or aligns) the local time source to a time of the GPS sensor within the max recovery time interval. The system generates a timestamp based on the recovered time source to timestamp sensor data for a sensor unit of the ADV.

In one embodiment, the system determines that the difference between the local time source and a time of the GPS sensor to be greater than the max limit. The system plans an abrupt recovery of the time source to assign the local time source to be a time of the GPS sensor.

In one embodiment, the system plans the smooth recovery of the time source to converge the local time source to a time of the GPS sensor based on a predetermined or set time increment different from the max recovery increment. In one embodiment, the predetermined time increment is a single clock cycle interval. In one embodiment, the single clock cycle interval is 10 nanoseconds.

In one embodiment, the max limit and the recovery increment or max recovery time interval are preconfigured by a user. In one embodiment, the difference in time between a local time source and a time of the GPS sensor is determined upon detecting a signal recovery from the GPS sensor.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of network such as a local area network (LAN), a wide area network (WAN) such as the Internet, a cellular network, a satellite network, or a combination thereof, wired or wireless. Server(s) 103-104 may be any kind of server or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to operate in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-113 and 115 may be communicatively coupled to each other via an interconnect, a bus, a network, or a combination thereof. For example, components 110-113 and 115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
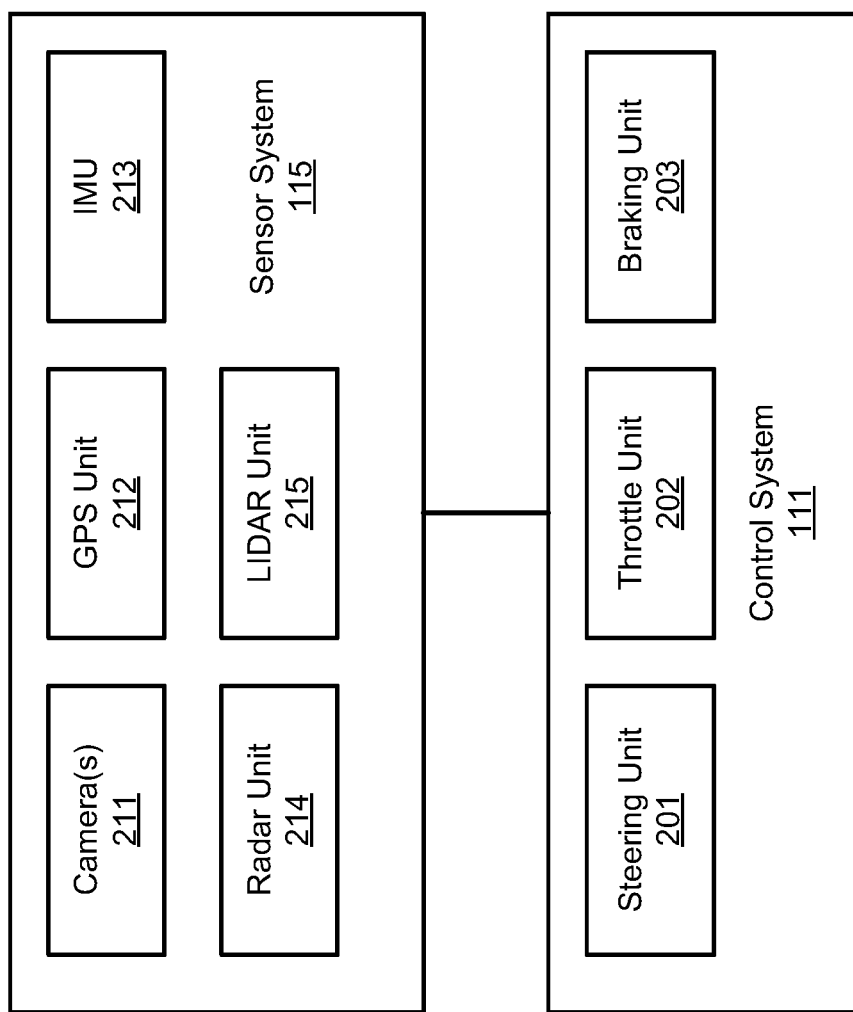
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include rules or algorithms for perception, prediction, decision, planning, and/or control processes, which will be described in details further below. Algorithms 124 can then be uploaded on ADVs to be utilized during autonomous driving in real-time.

Figure 3A:
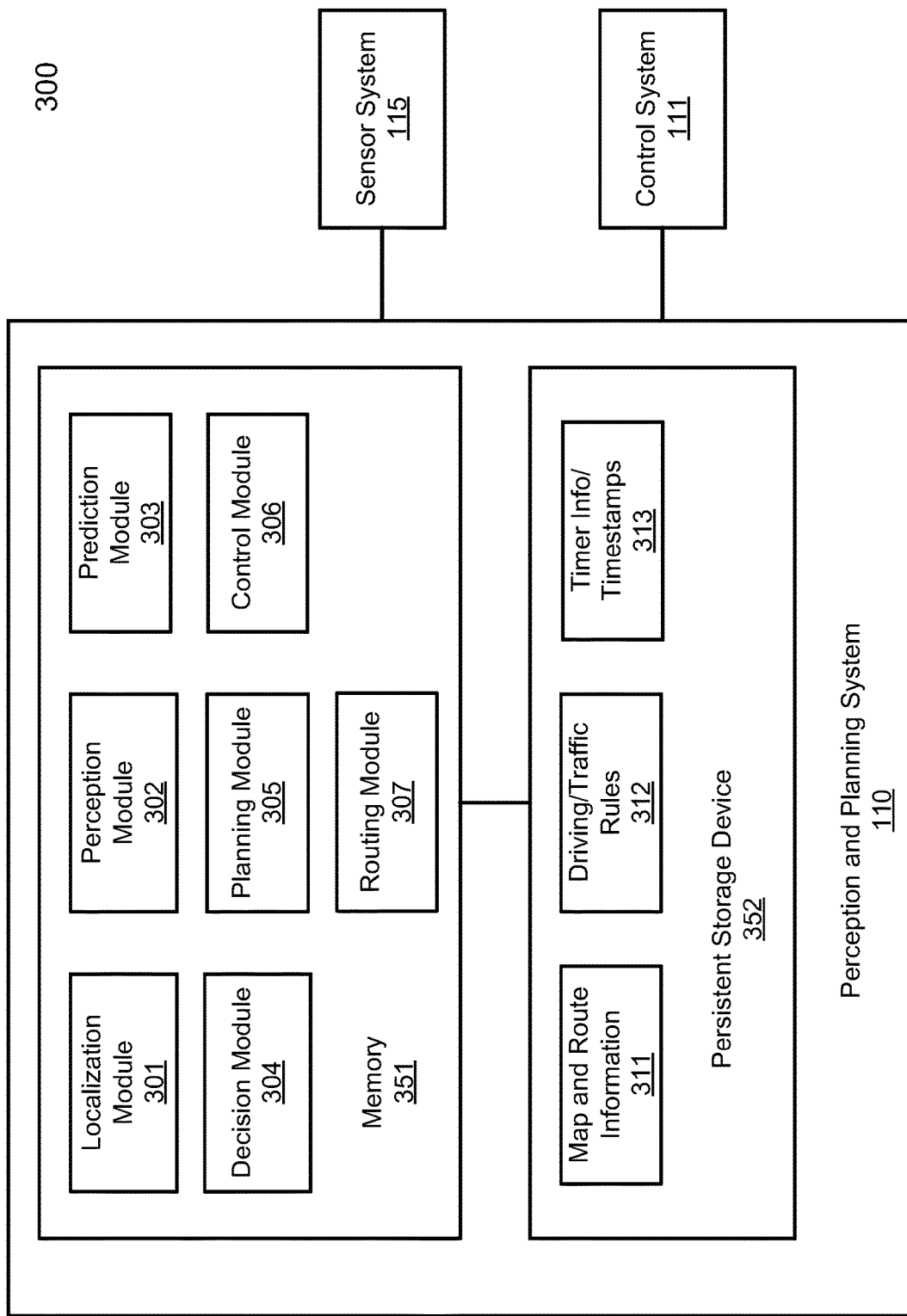
FIGS. 3A-3B are block diagrams illustrating an example of a perception and planning system used with an autonomous vehicle according to one embodiment.
Figure 3B:
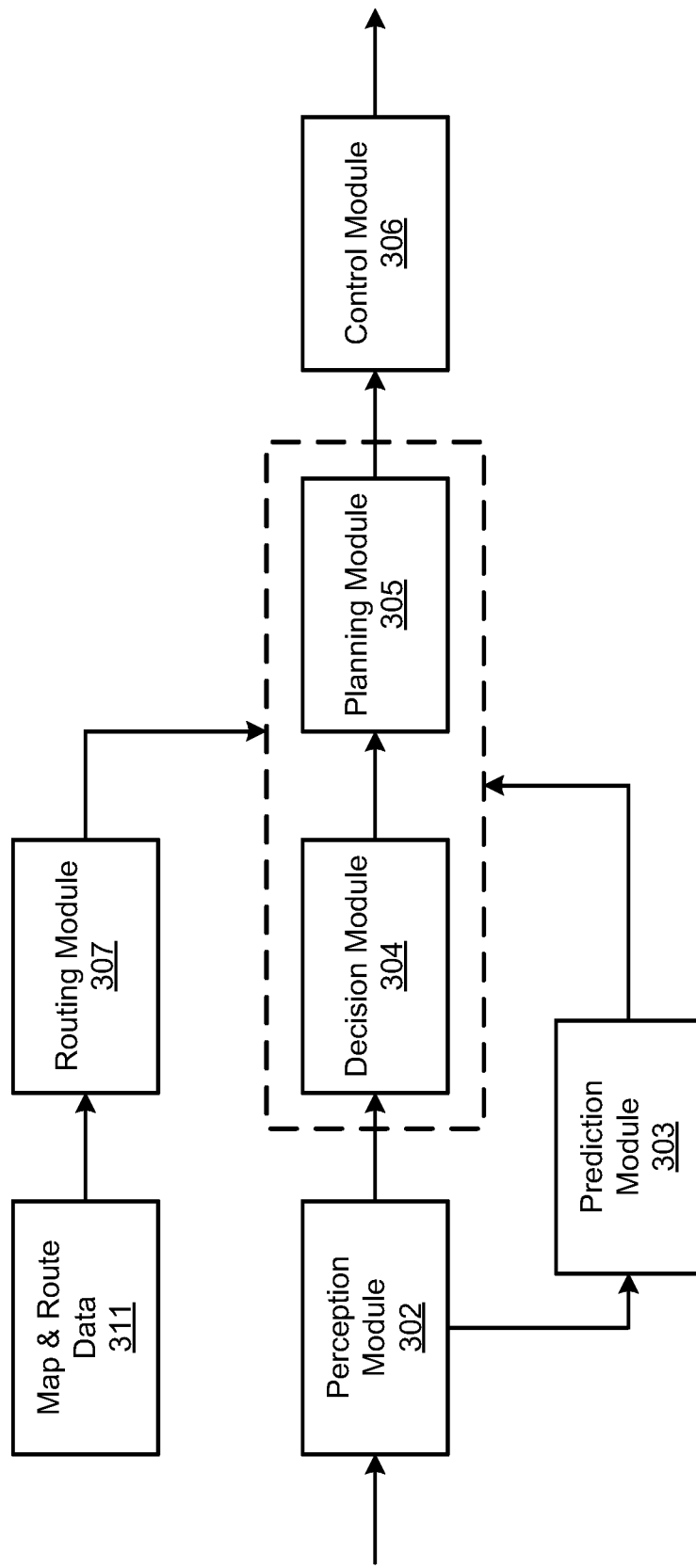

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, and routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of autonomous vehicle 101 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 101, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 101 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts how the object will behave under the circumstances. The prediction is performed based on the perception data perceiving the driving environment at the point in time in view of a set of map/route information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to entering the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follow the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 101 would move in a next moving cycle (e.g., next route/path segment). For example, the planning and control data may instruct vehicle 101 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

FIG. 4 is a block diagram illustrating system architecture for autonomous driving according to one embodiment. System architecture 400 may represent system architecture of an autonomous driving system as shown in FIGS. 3A and 3B. Referring to FIG. 4, system architecture 400 includes, but it is not limited to, application layer 401, planning and control (PNC) layer 402, perception layer 403, driver layer 404, firmware layer 405, and hardware layer 406. Application layer 401 may include user interface or configuration application that interacts with users or passengers of an autonomous driving vehicle, such as, for example, functionalities associated with user interface system 113. PNC layer 402 may include functionalities of at least planning module 305 and control module 306. Perception layer 403 may include functionalities of at least perception module 302. In one embodiment, there is an additional layer including the functionalities of prediction module 303 and/or decision module 304. Alternatively, such functionalities may be included in PNC layer 402 and/or perception layer 403. System architecture 400 further includes driver layer 404, firmware layer 405, and hardware layer 406. Firmware layer 405 may represent at least the functionality of sensor system 115, which may be implemented in a form of a field programmable gate array (FPGA). Hardware layer 406 may represent the hardware of the autonomous driving vehicle such as control system 111 and/or sensor system 115. Layers 401-403 can communicate with firmware layer 405 and hardware layer 406 via device driver layer 404.

Figure 5:
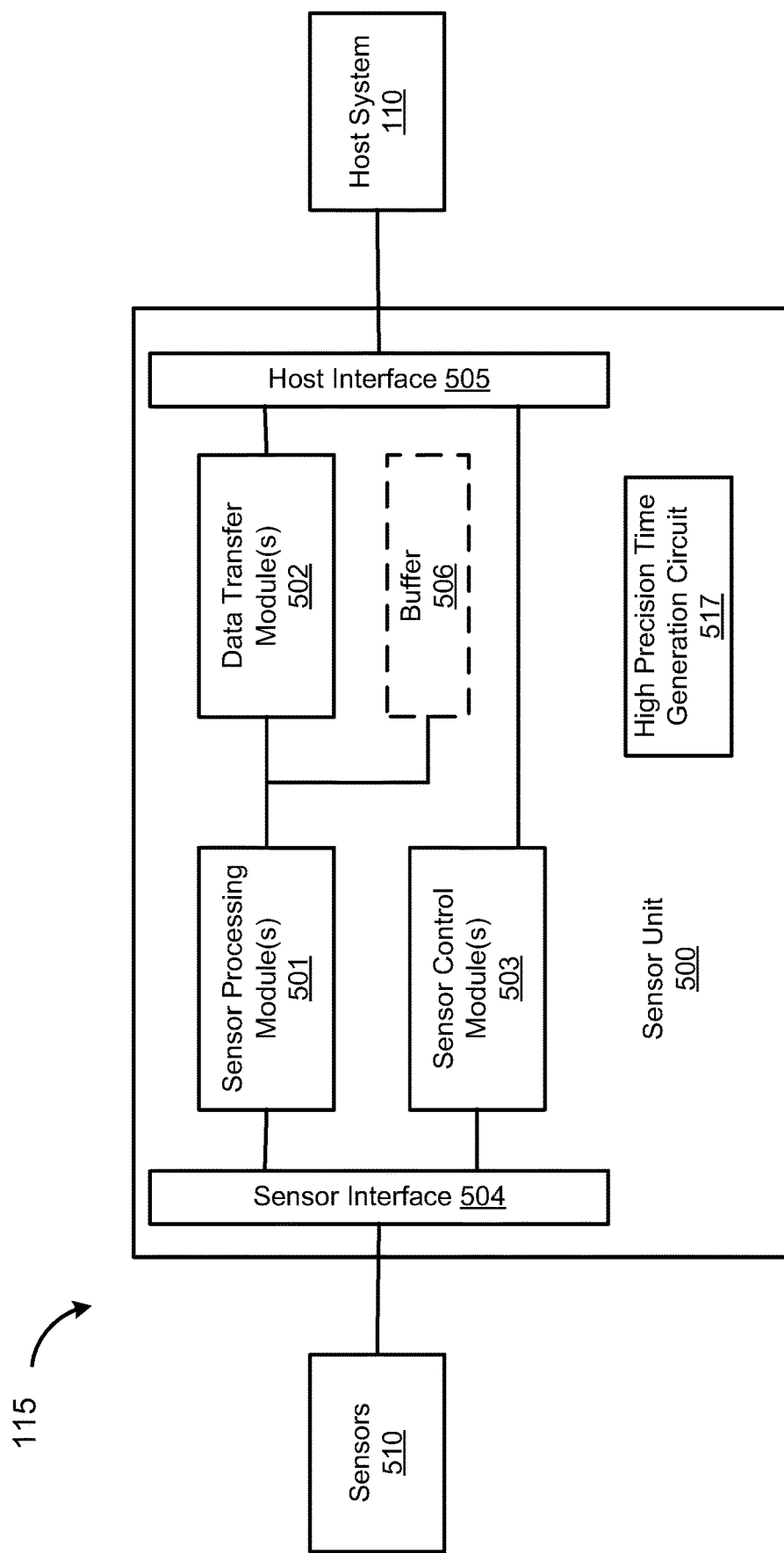
FIG. 5 is a block diagram illustrating an example of a sensor unit according to one embodiment.

FIG. 5 is a block diagram illustrating an example of a sensor system according to one embodiment of the invention. Referring to FIG. 5, sensor system 115 includes a number of sensors 510 and a sensor unit 500 coupled to host system 110. Host system 110 represents a planning and control system as described above, which may include at least some of the modules as shown in FIGS. 3A and 3B. Sensor unit 500 may be implemented in a form of an FPGA device or an ASIC (application specific integrated circuit) device. In one embodiment, sensor unit 500 includes, amongst others, one or more sensor data processing modules 501 (also simply referred to as sensor processing modules), data transfer modules 502, and sensor control modules or logic 503. Modules 501-503 can communicate with sensors 510 via a sensor interface 504 and communicate with host system 110 via host interface 505. Optionally, an internal or external buffer 506 may be utilized for buffering the data for processing.

In one embodiment, for the receiving path or upstream direction, sensor processing module 501 is configured to receive sensor data from a sensor via sensor interface 504 and process the sensor data (e.g., format conversion, error checking), which may be temporarily stored in buffer 506. Data transfer module 502 is configured to transfer the processed data to host system 110 using a communication protocol compatible with host interface 505. Similarly, for the transmitting path or downstream direction, data transfer module 502 is configured to receive data or commands from host system 110. The data is then processed by sensor processing module 501 to a format that is compatible with the corresponding sensor. The processed data is then transmitted to the sensor.

In one embodiment, sensor control module or logic 503 is configured to control certain operations of sensors 510, such as, for example, timing of activation of capturing sensor data, in response to commands received from host system (e.g., perception module 302) via host interface 505. Host system 110 can configure sensors 510 to capture sensor data in a collaborative and/or synchronized manner, such that the sensor data can be utilized to perceive a driving environment surrounding the vehicle at any point in time.

Sensor interface 504 can include one or more of Ethernet, USB (universal serial bus), LTE (long term evolution) or cellular, WiFi, GPS, camera, CAN, serial (e.g., universal asynchronous receiver transmitter or UART), SIM (subscriber identification module) card, and other general purpose input/output (GPIO) interfaces. Host interface 505 may be any high speed or high bandwidth interface such as PCIe interface. Sensors 510 can include a variety of sensors that are utilized in an autonomous driving vehicle, such as, for example, a camera, a LIDAR device, a RADAR device, a GPS receiver, an IMU, an ultrasonic sensor, a GNSS (global navigation satellite system) receiver, an LTE or cellular SIM card, vehicle sensors (e.g., throttle, brake, steering sensors), and system sensors (e.g., temperature, humidity, pressure sensors), etc.

For example, a camera can be coupled via an Ethernet or a GPIO interface. A GPS sensor can be coupled via a USB or a specific GPS interface. Vehicle sensors can be coupled via a CAN interface. A RADAR sensor or an ultrasonic sensor can be coupled via a GPIO interface. A LIDAR device can be coupled via an Ethernet interface. An external SIM module can be coupled via an LTE interface. Similarly, an internal SIM module can be inserted onto a SIM socket of sensor unit 500. The serial interface such as UART can be coupled with a console system for debug purposes.

Note that sensors 510 can be any kind of sensors and provided by various vendors or suppliers. Sensor processing module 501 is configured to handle different types of sensors and their respective data formats and communication protocols. According to one embodiment, each of sensors 510 is associated with a specific channel for processing sensor data and transferring the processed sensor data between host system 110 and the corresponding sensor. Each channel includes a specific sensor processing module and a specific data transfer module that have been configured or programmed to handle the corresponding sensor data and protocol.

In one embodiment, sensor unit 500 includes high precision time generation circuit 517. High precision time generation circuit 517 can generate a time and/or a timestamp to be used by each of sensors 510 to keep track of when sensor data are transmitted or captured/triggered by each of sensors 510, and/or received by sensor unit 500, as shown in FIGS. 6A-6B.

Figure 6A:
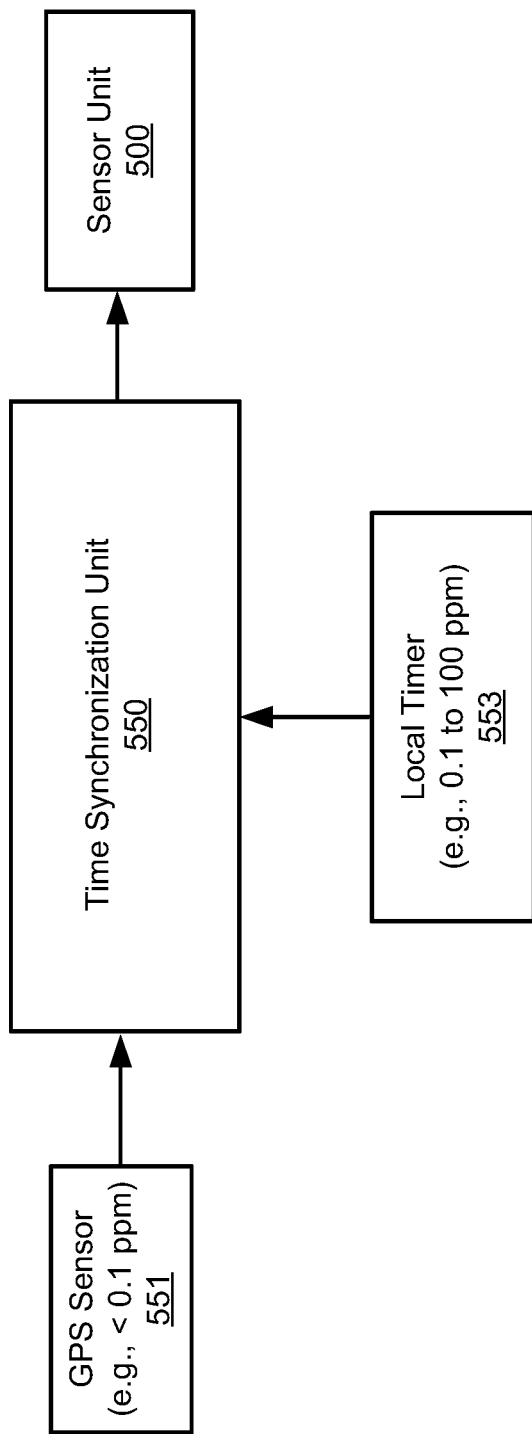
FIG. 6A is a block diagram illustrating an example of a high precision time generation unit according to one embodiment.

Referring now to FIG. 6A, high precision time generation circuit 517 can include time synchronization unit 550, GPS sensor 551, and local timer 553. Time synchronization unit 550 can synchronize local timer 553 with respect to a time derived from a pulse per second (PPS) signal from GPS sensor 551. The PPS can be used to align local timer 553 for precise time measurements, to the nanoseconds. GPS sensor 551 can be part of GPS unit 212 of sensor system 115 of FIG. 2 or GPS sensor 551 can be a dedicated GPS sensor integrated within high precision time generation circuit 517. Local timer 553 can generate a time for sensor unit 500. Local timer 553 can be a timer from any local RTCs (e.g., CPU RTC or FPGA RTC) or sensors of sensor unit 500, or a time retrieved from an external source such as a cellular source, e.g., 4G, long-term evolution (LTE), 5G, a WIFI source, FM receiver, etc.

Figure 6B:
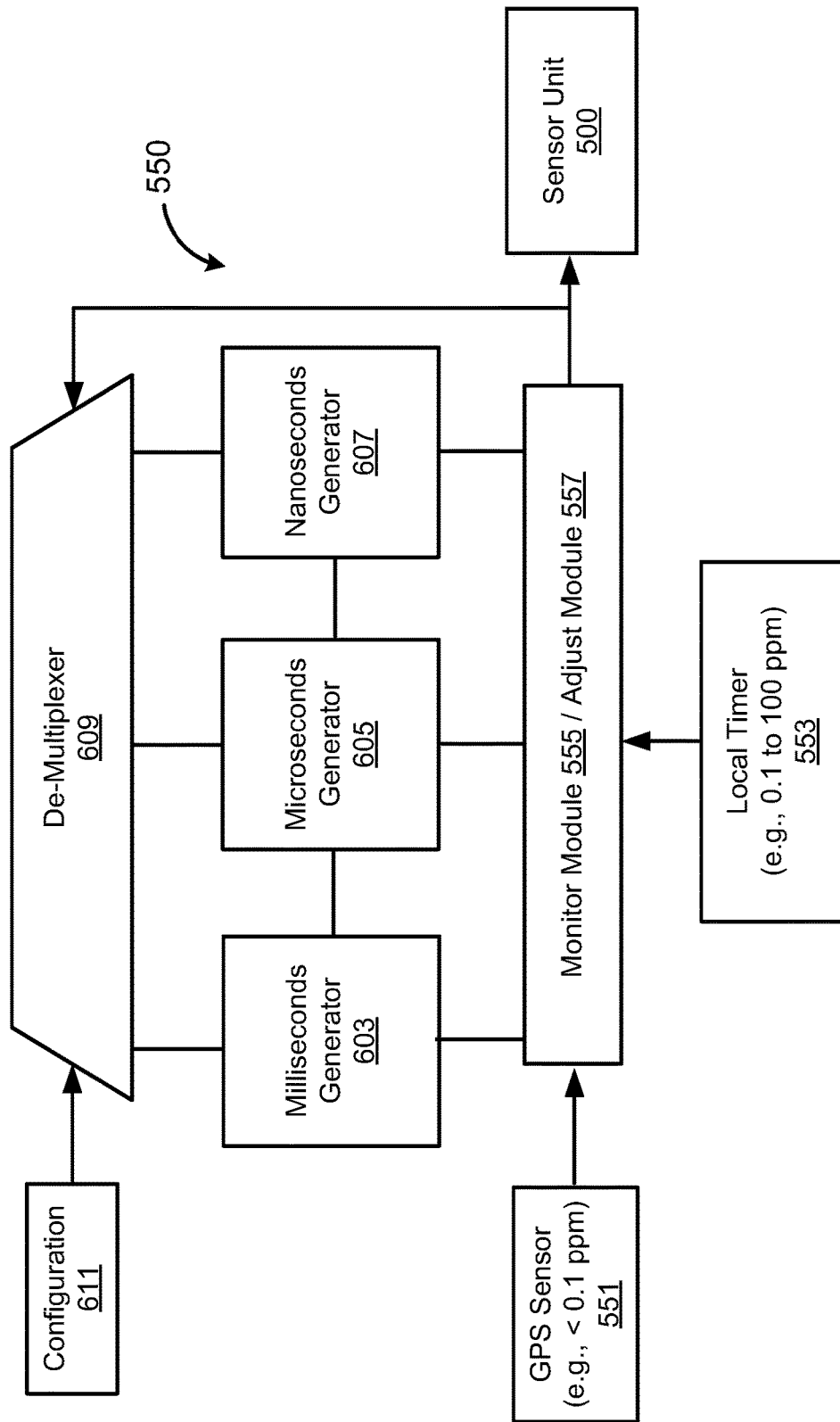
FIG. 6B is a block diagram illustrating an example of a high precision time generation unit with three counter generators according to one embodiment.

Referring to FIG. 6B, time synchronization unit 550 can include monitor module 555, adjust module 557, millisecond generator 603, microsecond generator 605, nanosecond generator 607, de-multiplexer 609, and configuration 611. Millisecond generator 603, microsecond generator 605, and nanosecond generator 607 can generate millisecond, microsecond, and nanosecond oscillation cycles respectively (e.g., oscillator counters at three different granularities) based on an oscillator of local timer 553. Configuration 611 can configure a select signal to select which of the outputs for millisecond generator 603, microsecond generator 605, and nanosecond generator 607 are to be routed to monitor module 555. Monitor module 555 can monitor the generated oscillation cycles to count these cycles. Adjust module 557 can adjust the counts (or modifies the count representations)

so to sync the local timer 553 with a PPS signal from GPS sensor 551. In one embodiment, select signal for configuration 611 can be programmed by a user of sensor unit 500 or by monitor module 555/adjust module 557 in a feedback loop. For example, a user can configure to disable the milliseconds generator if it is determined that local timer 553 is relatively precise.

Depending on the type of crystal oscillators used, local timer 553 can have an accuracy ranging from 0.1 to 100 ppm, e.g., any pulse can be off by 0.1 to 100 microseconds, whereas the pulse per second (PPS) signal from GPS sensor 551 has an accuracy rate of less than 0.1 ppm, or less than 0.1 microseconds of deviations for each pulse for each second. For a 0.1 ppm GPS PPS signal, a received PPS signal from GPS sensor 551 can assert consecutive pulses to be between 999,999.9 and 1,000,000.1 microseconds every second, while a typical 100 ppm local timer 553 can assert consecutive pulses to be between 999,900 and 1,000,100 microseconds every second. Furthermore, the variations in deviations of the pulses for local timer 553 can change in real-time due to changes in ambient temperature of the crystal oscillator ICs using by local timer 553. Thus, an objective is to adjust or sync local timer 553 to match GPS sensor 551 in real-time.

To sync local timer 553 to GPS sensor 551, in one embodiment, GPS sensor 551 receives a GPS pulse signal (PPS) that is a RF signal transmitted by a satellite broadcasting its signal in space with a certain accuracy rate, e.g., <0.1 ppm. In some embodiments, GPS sensor 551 receives the PPS signal from a first GPS satellite followed by a PPS signal from a second GPS satellite if the first GPS satellite is out of range. Because GPS satellites use its own precise measure of time with each satellite having its own on-board set of atomic clocks, PPS signals from the GPS satellites can be viewed as one or more reference timers. Note, however, because local timer 553 is adjusted in real-time to match any one GPS PPS signal, it is assumed that any time discrepancies when GPS PPS signals of two or more different GPS satellites are not a concern since the local timer 553 can be synced smoothly in real-time, as described further below.

Once a GPS PPS signal is received, monitor module 555 can determine any offsets of a time of the PPS signal and a time for local timer 553 and can generate a second local real-time clock/timer based on the determined offsets. For example, based on the PPS signal, date and time information (Coordinated Universal Time or UTC format) can initially be provided by GPS (National Marine Electronics Association) NMEA data information, accurate up to the seconds. Next, in one embodiment, milliseconds generator 603 can generate a close-to-one-millisecond oscillation count (e.g., a first granularity) using local timer 553. The close-to-one-millisecond oscillation count can be generated using a frequency divider circuit to divide a signal frequency of the local timer 553. Monitor module 555 may then detect or count a number of cycles (e.g., 999 cycles) from milliseconds generator 603 for a GPS PPS signal time interval of one second, e.g., local timer 553 lags the GPS PPS signal by about one millisecond. Because milliseconds generator 603 lags the GPS PPS, in one embodiment, adjust module 557 adjusts the milliseconds generator output to represent 1.001 milliseconds per oscillation. Milliseconds generator 603 then generates the following 1000 oscillation representations for each second: 0.000, 1.001, 2.002, . . . , 999.999, and 1001 milliseconds. So the $999^{th}$ cycle from milliseconds generator 603 counts to 999.999 milliseconds.

Next, microseconds generator 605 can generate a close-to-one-microsecond oscillation count using local timer 553. The close-to-one-microsecond oscillation count (e.g., a second granularity) can be generated using a second frequency divider circuit to divide a signal frequency of the local timer 553. Monitor module 555 may count 998 cycles from microseconds generator 605 or a 2 microseconds offset for a GPS PPS time interval of one millisecond. Again, because microseconds generator 605 lags the GPS PPS, adjust module 557 adjusts the microseconds generator output to represent 1.002 microseconds per oscillation. The microseconds generator then generates the following 1000 oscillation representations for each millisecond: 0.000, 1.002, 2.004, . . . , 999.996, 1000.998, and 1002 microseconds. So the $998^{th}$ cycle counts to 999.996 microseconds.

Next, nanoseconds generator 607 can generate a close-to-one-nanosecond oscillation count using local timer 553. The close-to-one-nanosecond oscillation count (e.g., a third granularity) can be generated using a third frequency divider circuit to divide a signal frequency of the local timer 553. Monitor module 555 may count 997 cycles from nanoseconds generator 607 or detect a 3 nanoseconds offset for a GPS PPS signal time interval of one microsecond. Again, adjust module 557 can adjust the nanoseconds generator output to represent 1.003 nanosecond per oscillation. The nanoseconds generator then generates the following 1000 oscillation representations for each microsecond: 0.000, 1.003, 2.006, . . . , 999.991, 1000.994, 1001.997, and 1003 nanoseconds. So the $997^{th}$ cycle from the nanoseconds generator 607 counts to 999.991 nanoseconds. This way, any of the generator outputs (e.g., representations) or a combination thereof, can generate a high precision time in real-time. The high precision time can then be provided to the sensors of sensor unit 500. In the above example, the generated time has a precision up to one nanosecond using the nanoseconds generator. Note, although three generators (e.g., three granularities) are described, any number of generators and granularities can be used to generate a high precision time.

In some embodiment, configuration 611 can selectively enable/disable, via de-multiplexer 609, any of generators 603-607. The selectivity can turn on/off any of the generators. Selectivity is useful to select a subset of the generator outputs (e.g., only nanosecond generator) when only a subset of the outputs is required. In another embodiment, monitor module 555 buffers (e.g., saves) the offsets for the different granularities and maintaining the first, second, and third count values (e.g., value representations per oscillation) if a GPS sensor signal is lost, until the GPS sensor signal is again regained.

FIG. 7 is a flow diagram illustrating a method according to one embodiment. Processing 700 may be performed by processing logic which may include software, hardware, or a combination thereof. For example, process 700 may be performed by sensor unit 500 of FIG. 5. Referring to FIG. 7, at block 701, processing logic receives, at a sensor unit, a global positioning system (GPS) pulse signal from a GPS sensor of the ADV, where the GPS pulse signal is a RF signal transmitted by a satellite to the GPS sensor, where the sensor unit is coupled to a plurality of sensors mounted on the ADV and a host system, where the host system includes a perception module and a planning and control (PNC) module, where the perception module is to perceive a driving environment surrounding the ADV based on sensor data obtained from the sensors and processed by a processing module of the sensor unit, and where the PNC module is to plan a path to autonomously drive the ADV based on perception data. At block 702, processing logic receives a first local oscillator signal from a local oscillator of the sensor unit. At block 703, processing logic synchronizes the first local oscillator signal to the GPS pulse signal in real-time, including modifying the first local oscillator signal based on the GPS pulse signal. At block 704, processing logic generates a second oscillator signal based on the synchronized first local oscillator signal, wherein the second oscillator signal is provided to at least one of the sensors to be used as a clock signal to operate the sensor unit.

In one embodiment, synchronizing the local oscillator includes generating a first counter having a first granularity using the local oscillator, monitoring the first counter to count a number of oscillations at the first granularity to reach a time interval of the GPS pulse signal, where each count represents an oscillation at the first granularity, calculating a first count value based on the monitored first counter at the first granularity, and modifying the first counter so that each count represents a fraction of an oscillation at the first granularity based on the calculated first count value to synchronize the local oscillator at the first granularity.

In another embodiment, synchronizing the local oscillator includes generating a second counter having a second granularity using the local oscillator, monitoring the second counter to count a number of oscillations at the second granularity to reach a time interval of the GPS pulse signal, where each count represents an oscillation at the second granularity, calculating a second count value based on the monitored second counter at the second granularity, and modifying the second counter so that each count represents a fraction of an oscillation at the second granularity based on the calculated second count value to synchronize the local oscillator at the second granularity.

In another embodiment, synchronizing the local oscillator includes generating a third counter having a third granularity using the local oscillator, monitoring the third counter to count a number of oscillations at the third granularity to reach a time interval of the GPS pulse signal, where each count represents an oscillation at the third granularity, calculating a third count value based on the monitored third counter at the third granularity, and modifying the third counter so that each count represents a fraction of an oscillation at the third granularity based on the calculated third count value to synchronize the local oscillator at the third granularity. In another embodiment, the first granularity is a millisecond granularity, the second granularity is a microsecond granularity, and the third granularity is a nanosecond granularity.

In another embodiment, processing logic further disables the generation of any of the first, second, or the third counters for synchronization. In another embodiment, processing logic further maintains the first, second, and third count values if the GPS sensor signal is lost, until the GPS sensor signal is again regained.

Figure 8:
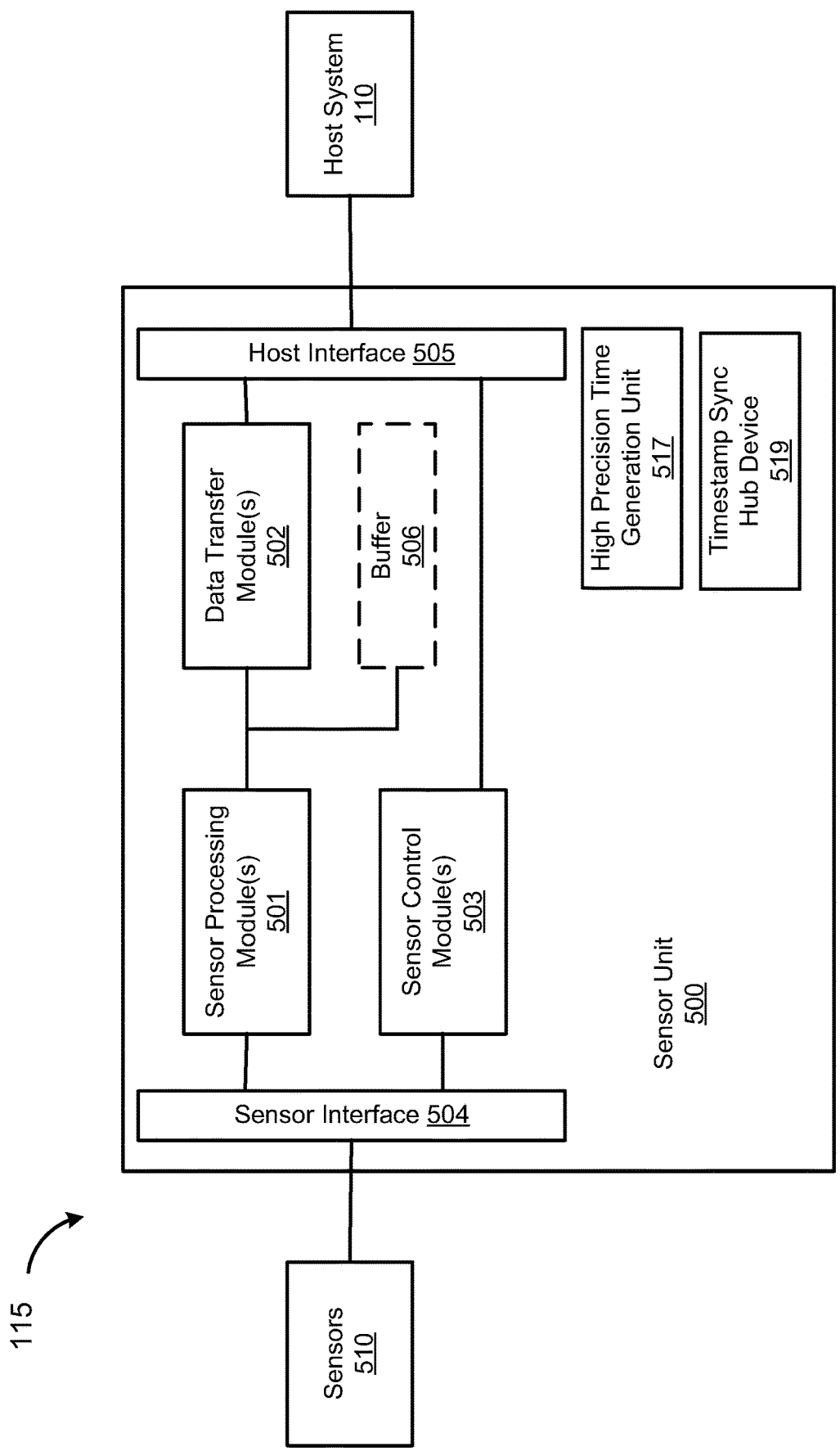
FIG. 8 is a block diagram illustrating an example of a sensor unit according to one embodiment.

FIG. 8 is a block diagram illustrating an example of a sensor unit according to one embodiment. FIG. 8 is similar to FIG. 5 except with the addition of timestamp sync hub device 519. Timestamp sync hub device 519 can generate one or more timestamps (e.g., receive RX timestamp, transmit TX timestamp, and/or trigger timestamp) for any of sensors 510 or simply provide a time information to any of sensors 510. Timestamp sync hub device 519 can be coupled to each sensor in various fashions, but each sensor is coupled to a TX timestamp generator, a RX timestamp generator, or both. Accuracy of RX/TX and trigger timestamps is crucial to keep track of sensor data acquisition times.

Figure 9:
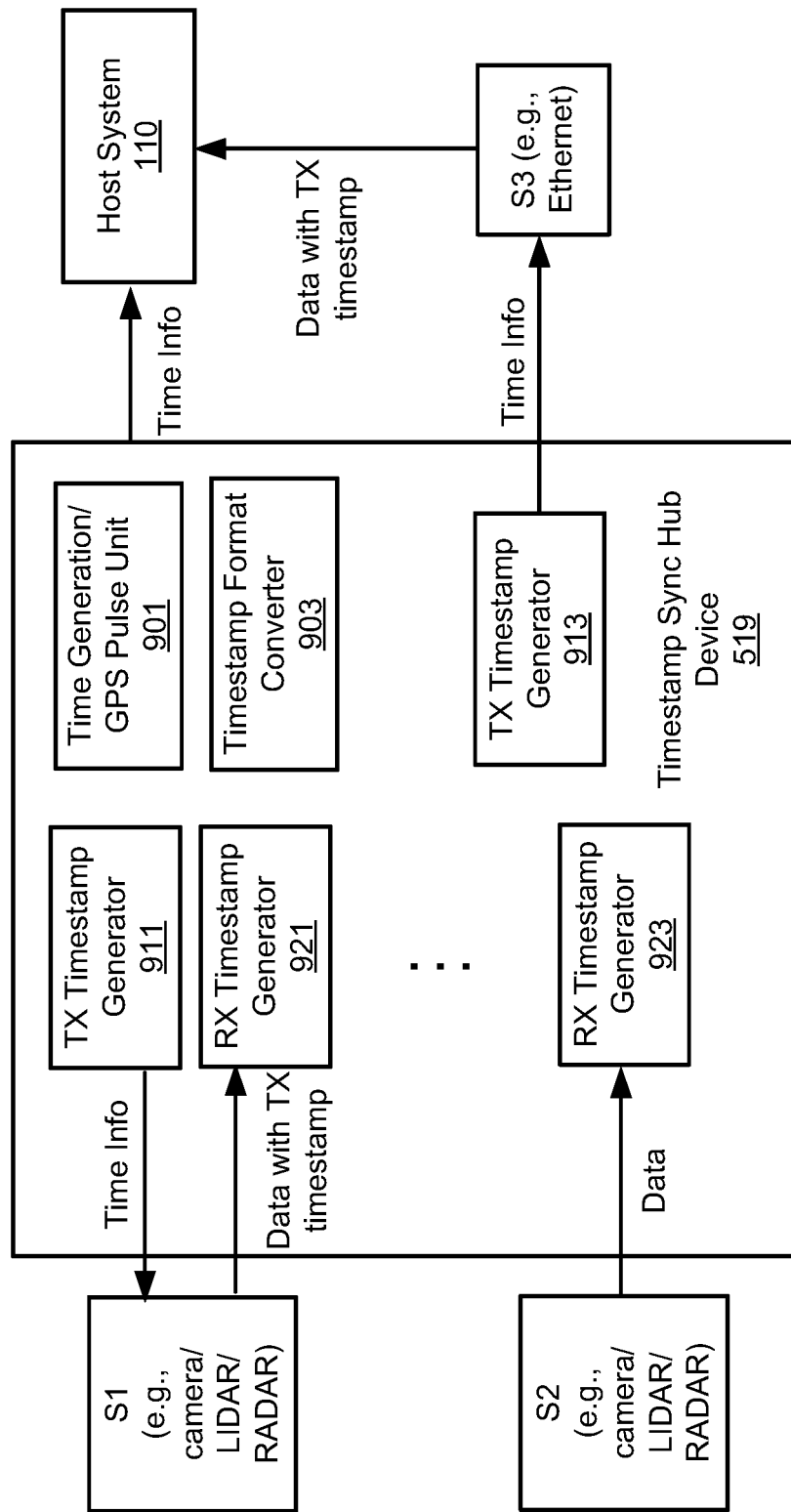
FIG. 9 is a block diagram illustrating an example of a timestamp sync hub device according to one embodiment.

FIG. 9 is a block diagram illustrating an example of a timestamp sync hub device according to one embodiment. Timestamp sync hub device 519 includes time generation or GPS pulse unit 901, timestamp format converters 903, TX timestamp generators 911-913 and RX timestamp generators 921-923. Timestamp sync hub device 519 is coupled to a number of sensors (e.g., S1, S2, and S3) to provide TX/RX and/or trigger timestamps for the sensors. Time generation or GPS pulse unit 901 can generate a time or provide a GPS pulse for the sensors S1-S3. Timestamp format converter 903 can convert one timestamp format to another, for example, a timestamp may be converted from a format of ms:μs:ns:mm:ss:hh:month:day:year to a format mm:ss:hh:month:day:year. The timestamp format can include year, month, day, hour, minutes, seconds, milliseconds, microseconds, and nanoseconds in any combination and/or ordering. Timestamp format converter 903 can thus convert one format to another as required by time input parameters of some sensors, such as sensors S1 and S3.

TX timestamp generators 911-913 can generate a transmit timestamp for sensors of the sensor unit. In one embodiment, TX timestamp generator can simply route the GPS PPS to one or more sensors to provide a GPS PPS signal to the sensors (e.g., S1). Examples of a S1 sensor include Velodyne's LIDAR sensors which accept a GPS time information as an input. The GPS time input information is used to sync the LIDAR sensor to a GPS clock. After the sensor is synced, the LIDAR sensors can trigger/capture a depth image and include a trigger timestamp with the depth image. A second timestamp may be a transmit timestamp which represent a time when sensor S1 transmits sensor data from S1 to sensor unit 500. Here, the trigger timestamp and/or the transmit timestamp may be sent as metadata with the depth image from sensor S1 to sensor unit 500.

Another example of a S1 sensor includes a camera sensor which may accept a mm:ss:hh:month:day:year formatted time information as an input parameter. In this case, TX time stamp generator generates a mm:ss:hh:month:day:year format TX timestamp (as provided by time generation unit 901) to be sent to the camera sensor. The camera sensor can trigger/capture a RGB image having a trigger timestamp which can be derived from the TX timestamp (e.g., accounting for any in between delays). A second timestamp (transmit timestamp) representing when the sensor data is transmitted to sensor unit may be included with the trigger timestamp, as time information metadata. The sensor data along with the time information metadata can then be transmitted from camera sensor to sensor unit 500. Other examples of S1 sensors include RADAR sensors, SONAR sensors, and any sensors that accept a time input parameter.

In another embodiment, TX timestamp generator generates a timestamp in the mm:ss:hh:month:day:year format and provide the generated timestamp for one or more sensors, the mm:ss:hh:month:day:year timestamp having been synchronized with a GPS PPS signal. These sensors (e.g., S3) may transmit sensor data and timestamp metadata (unaltered) directly to host system 110. A direct coupling to host system 110 may be established when no more communication channels are available or when the sensor data only requires a low bandwidth, such as an Ethernet connection. Examples of S3 sensors can include Ethernet, camera and/or RADAR sensors, etc.

RX timestamp generators 921-923 can generate a receive timestamp at the time when sensor unit 500 receives the sensor data and to add the generated receive timestamp as time metadata to the sensor data. So when the sensor data are sent to host system 110, there is available information about a time when sensor unit 500 acquired the sensor data. Examples of sensors that use RX timestamp generators are S1 and S2. The difference between S1 and S2 is that S1 also provides transmit (TX) and/or trigger timestamp information, whereas S2 provides only receive (RX) timestamp information. Examples of S2 sensors include LIDAR, camera and/or RADAR sensors, etc.

In another embodiment, timestamp sync hub device 519 is coupled to host system 110 (e.g., through PCIe bus) to provide a time information (e.g., time information/timestamps 313) to host system 110. The provided time information allows host system 110 to sync an RTC (e.g., CPU-RTC) of host system 110 to the provided time such that a single global time is used among sensor unit 500 and host system 110. Thereafter a planning and control module of host system 110 for the ADV can plan and control the ADV autonomously using a local RTC of host system 110 which is synced to sensor unit 500.

Figure 10:
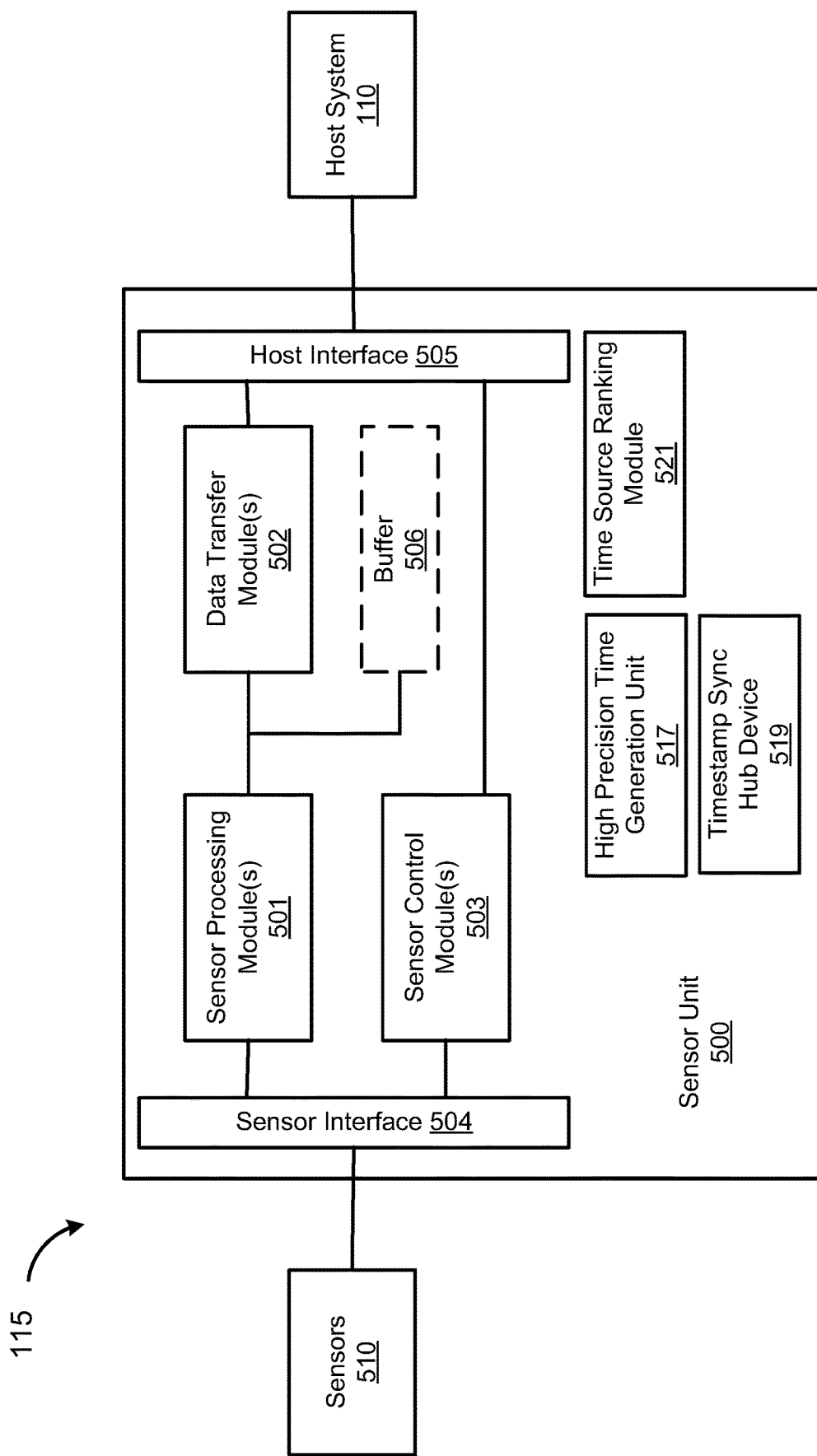
FIG. 10 is a block diagram illustrating an example of a sensor unit according to one embodiment.

FIG. 10 is a block diagram illustrating an example of a sensor unit according to one embodiment. FIG. 10 is similar to FIG. 8 except with the addition of time source ranking module 521. Time source ranking module 521 can rank a number of available time source according to suitability of the time source to be used as a local RTC (e.g., local timer 553 of FIG. 6A).

Figure 11:
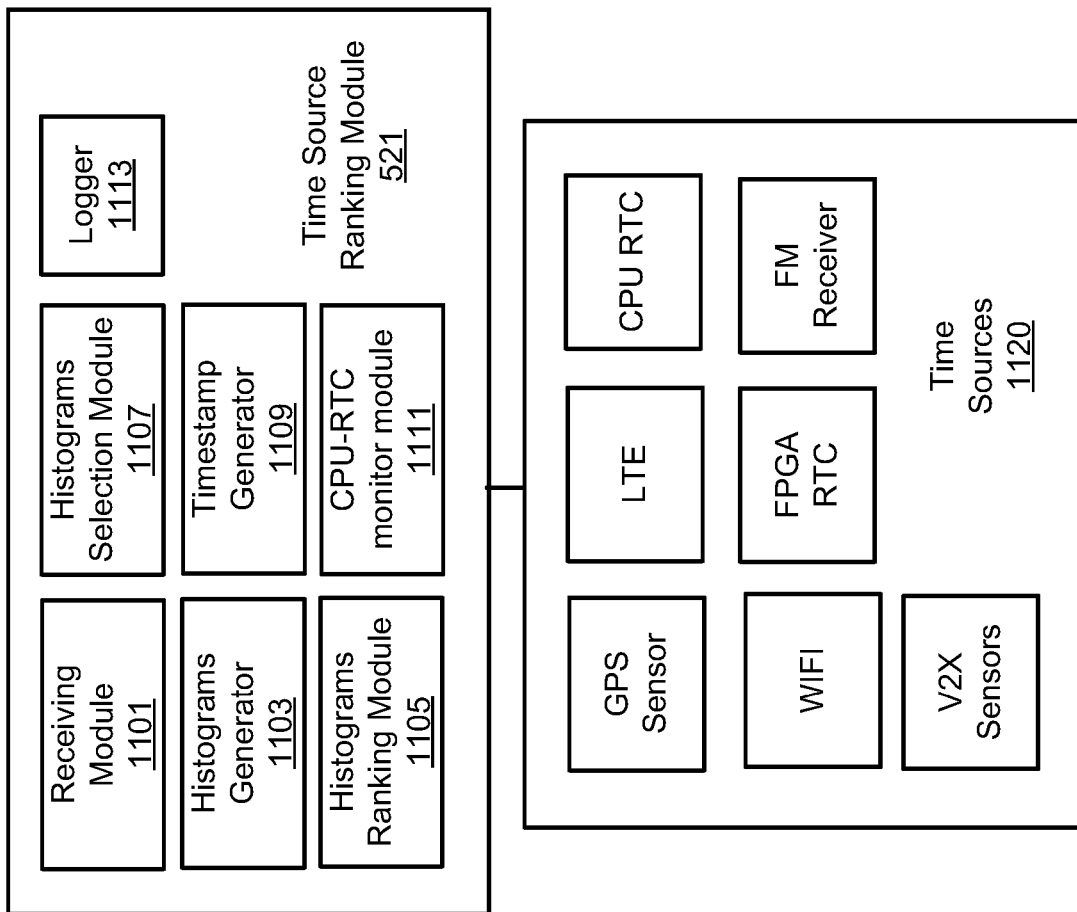
FIG. 11 is a block diagram illustrating an example of a time source ranking module according to one embodiment.

FIG. 11 is a block diagram illustrating an example of a time source ranking circuit according to one embodiment. Referring to FIG. 11, time source ranking module 521 can include sub-modules such as receiving module 1101, histograms generator 1103, histograms ranking module 1105, histograms selection module 1107, timestamp generator 1109, CPU-RTC monitor module 1111, and logger 1113. Time sources 1120 may include GPS sensor, LTE, CPU RTC, WIFI, FPGA RTC, FM receiver, and V2X sensors.

Receiving module 1101 can receive timestamps or time information from the different time sources 1120. Histograms generator 1103 can generate a difference histogram based on the received timestamps or time information from the different time sources 1120. In one embodiment, the difference histogram can be a difference histogram averaged over a period of time, e.g., a few hours or a day. In another embodiment, the difference histogram averaged over a period of time can be a running average. Histograms ranking module 1105 can rank the time sources using the GPS sensor time source as a reference time source, e.g., the time source is ranked from least to greatest time differences in comparison to a time of the GPS sensor. Histograms selection module 1107 can select a time source with a time with the least difference to a time of the GPS sensor time source. Timestamp generator 1109 can generate time information or timestamps based on the selected time source. CPU-RTC monitor module 1111 can monitor a time different of a time for the CPU-RTC and the GPS sensor. Logger 1113 can store time information of the CPU-RTC to a log file such as a delta time or time difference of a time for the CPU-RTC and the GPS sensor.

Time source ranking module 521 is used by an ADV when the ADV ignition is turned on in an underground parking garage (e.g., when there is no GPS signal). In one embodiment, because sensor unit 500 or host system 110 still requires a relatively accurate time to generate timestamps, if there lacks information about accuracies of available time sources of sensor unit 500 or the ADV, a default ranking list of time sources can be used to determine a preferred time source. An example of a default ranking list can rank various time sources in an order such as: GPS, FPGA RTC, WIFI, LTE, and CPU RTC. In this case, if the only available time sources are from an FPGA RTC and a WIFI signal, the FPGA RTC time source has priority and is the preferred time source to establish a local time, such as a local time of local timer 553 of FIG. 6A. However, as soon as a signal from a GPS sensor is available, in one embodiment, time source ranking module 521 determines accuracy of the different available time sources based on a ranking system.

In one embodiment, time source ranking module 521 generates a histogram based on the absolute difference values of the many available time sources, by a ranking system. The histograms or difference histograms may be generated for a few rounds, or these histograms can be averaged over a predetermined period of time, or as long as the GPS signal is available. The closest time source (e.g., least difference) to the GPS sensor as determined by the difference histogram is selected as the best time source to be used when the GPS signal is unavailable, e.g., the next time the ADV starts ignition in an underground garage. In one embodiment, a CPU RTC is preconfigured to be the preferred time source. In this case, a difference histogram, a delta time, or an average delta time for the CPU RTC is written to a log file or a log buffer by logger 1113. The difference histogram, a delta time, or an average delta time records a time difference for the CPU RTC and the GPS time. At the next ignition, without a GPS signal, sensor unit 500 can then adjusts the CPU RTC based on the delta time and uses the adjusted CPU RTC as the local time. In one embodiment, when the GPS signal is available, the delta time can be updated to reflect any deviations of the CPU RTC.

Figure 12:
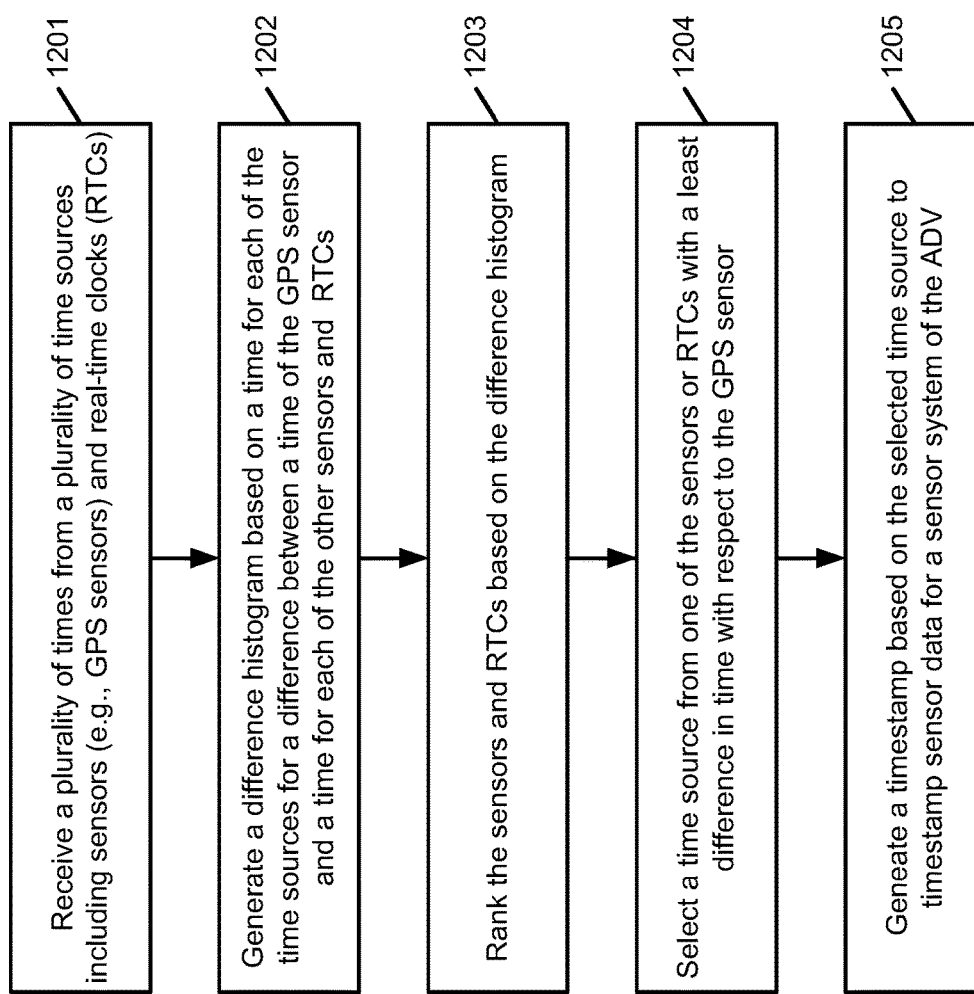
FIG. 12 is a flow diagram of a method to rank time sources according to one embodiment.

FIG. 12 is a flow diagram of a method to rank time sources according to one embodiment. Processing 1200 may be performed by processing logic which may include software, hardware, or a combination thereof. For example, process 1200 may be performed by time source ranking module 521 of FIG. 11. Referring to FIG. 12, at block 1201, processing logic receives a number of times from a number of time sources including sensors and RTCs, where the sensors are in communication with the ADV and the sensors include at least a GPS sensor, and where the RTCs include at least a central processing unit real-time clock (CPU-RTC). Note that CPU-RTC is a RTC for a CPU of the sensor unit. Examples of RTC and sensor time sources include GPS sensor, LTE, CPU RTC, WIFI, FPGA RTC, FM receiver, and V2X sensors. At block 1202, processing logic generates a difference histogram based on a time for each of the time sources for a difference between a time of the GPS sensor and a time for each of the other sensors and RTCs. At block 1203, processing logic ranks the sensors and RTCs based on the difference histogram. At block 1204, processing logic selects a time source from one of the sensors or RTCs with a least difference in time with respect to the GPS sensor. At block 1205, processing logic generates a timestamp based on the selected time source to timestamp sensor data for a sensor unit of the ADV.

In one embodiment, the difference histogram includes an average difference histogram comprising an average time difference distribution for the GPS sensors and each of the other sensors and RTCs. In one embodiment, processing logic defaults to a default list of ranking for sensors or RTCs when a difference histogram is unavailable.

In one embodiment, processing logic further stores time information of the CPU-RTC to a log file including a time difference of a time for the CPU-RTC and the GPS sensor, monitors the time difference of a time for the CPU-RTC and the GPS sensor, and updates time information in the log file based on the monitored time difference. In another embodiment, the time information is stored as binary data. In one embodiment, the time information is stored in a log buffer. In one embodiment, the time sources include: LTE, WIFI, CPU RTC, FPGA RTC, FM receiver, V2X sensors, or GPS sensors. In one embodiment, processing logic further logs the difference histogram and rankings of the sensors and RTCs to a log file or a log buffer.

Figure 13:
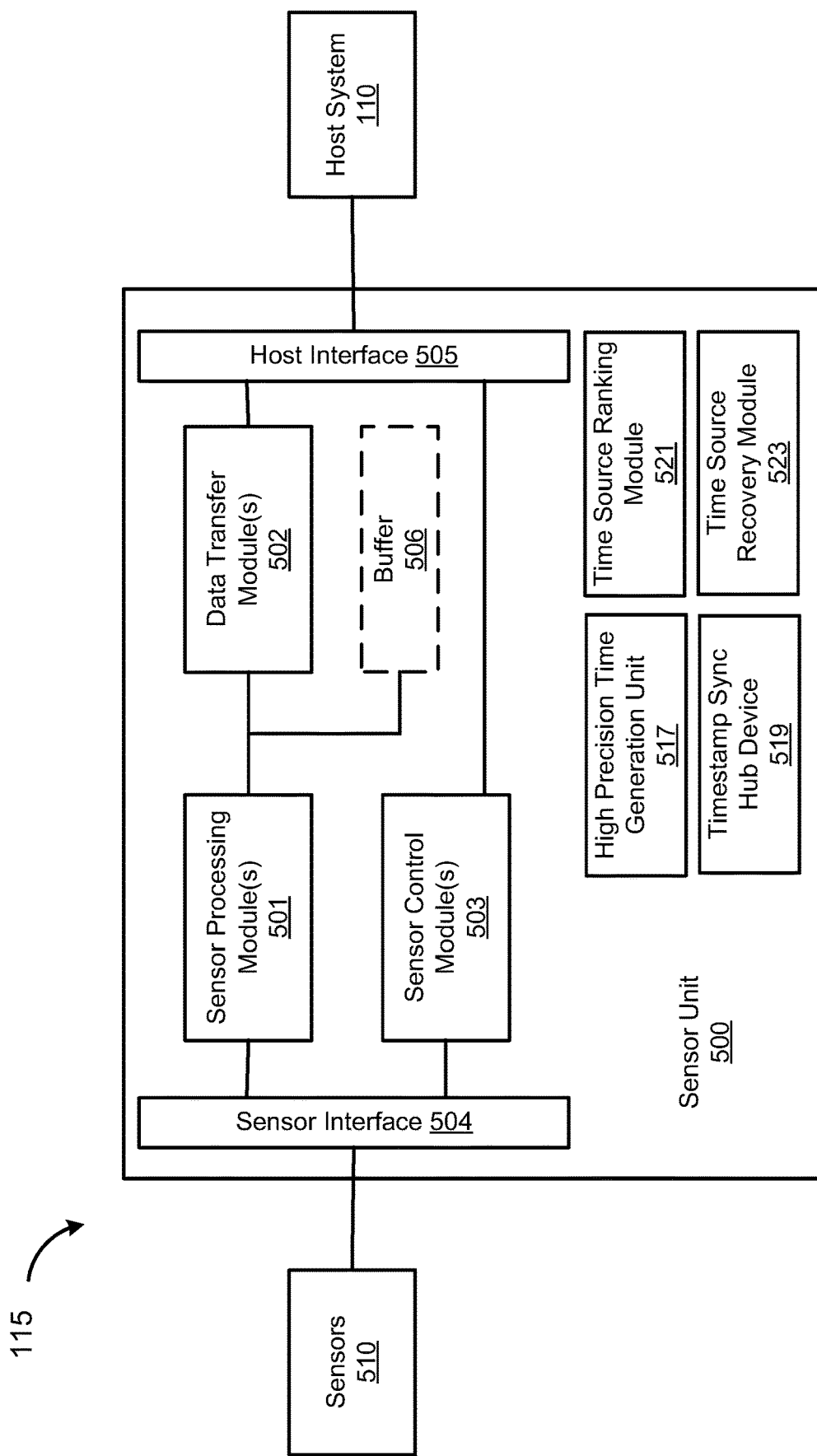
FIG. 13 is a block diagram illustrating an example of a sensor unit according to one embodiment.

FIG. 13 is a block diagram illustrating an example of a sensor unit according to one embodiment. FIG. 13 is similar to FIG. 10 except with the addition of time source recovery module 523. Time source recovery module 523 can recover a local time source when a GPS signal is unavailable for a period of time and then became available, e.g., recovery of a clock drift or a built-up of time discrepancy between the local time source and the GPS time source over the period of time.

Figure 14:
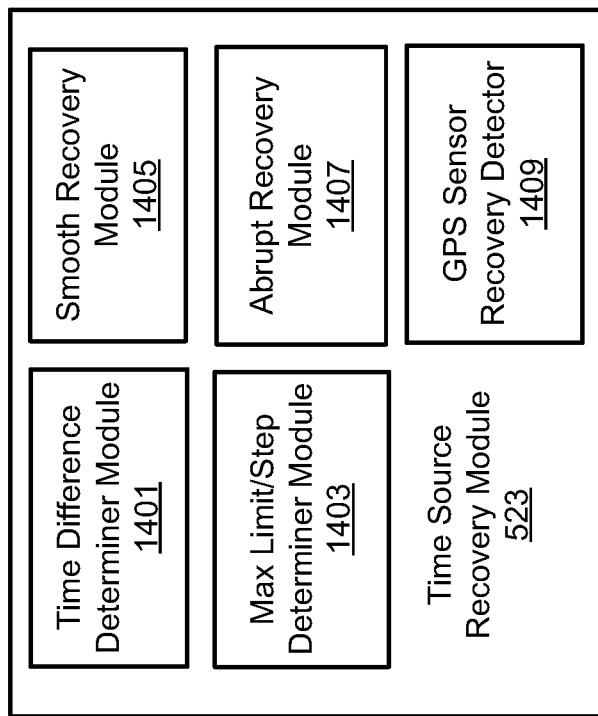
FIG. 14 is a block diagram illustrating an example of a time source recovery module according to one embodiment.

FIG. 14 is a block diagram illustrating an example of a time source recovery circuit according to one embodiment. Referring to FIG. 14, time source recovery module 523 includes submodules such as time difference determiner module 1401, max limit/step determiner module 1403, smooth recovery module 1405, abrupt recovery module 1407, and GPS sensor recovery detector 1409.

Time difference determiner module 1401 can determine a time difference or time discrepancy between a local time source and a GPS time source. Max limit/step determiner module 1403 can determine a max limit of a time discrepancy where a time recovery is to be performed smoothly, instead of abruptly. For example, if the time discrepancy is below a predetermined max limit then a time recovery is performed according to a smoothing logic. If the time discrepancy is above the max limit then a time recovery is performed according to an abrupt logic, e.g., an immediate alignment of the local time to the GPS time. Max limit/step determiner module 1403 can also determine a recovery increment/step (or recovery time interval) for a smooth time source recovery according to the smoothing logic. Smooth recovery module 1405 includes the smoothing logic and can perform a smooth time source recovery. Recovering smoothly is when the local time source catches up or aligns with the GPS time over a predetermined period of time using a predetermined increment steps. Abrupt recovery module 1407 can perform an abrupt time source recovery, e.g., align a time of the time source to the GPS time abruptly or immediately. GPS sensor recovery detector 1409 can detect transitions of a GPS signal, when it transitions from unavailable to available and/or when it transitions from available to unavailable.

For illustration, while ADV is on a surface road and can access an available GPS signal, local time (or local real-time clock) can be sourced and synced by the GPS PPS. When ADV enters a stretch of tunnel, GPS signal may become unavailable, and a local RTC or sensor such as CPU RTC can take over the function of a time source. Over the stretch of the tunnel, because the local time source may be inaccurate, a time discrepancy (e.g., a time difference between a time of the local time source and the GPS time) develops due to clock drift. As soon as the ADV exits the tunnel, GPS sensor recovery detector 1409 detects a GPS signal transition. Time difference determiner module 1401 then determines or calculates the time discrepancy between the local time source (the local time source may be selected based on time source difference histograms, as described above) and the GPS time. Max limit/step determiner module 1403 then compares the time difference with a max limit (the max limit may be preconfigured by a user), if the time difference is less than the max limit then a smoothing logic is applied (using a user preconfigured recovery increment/step) to the local time source to align the local time source to the GPS time.

Else, an abrupt logic is applied to the local time source to align the local time source to the GPS time.

Figure 15:
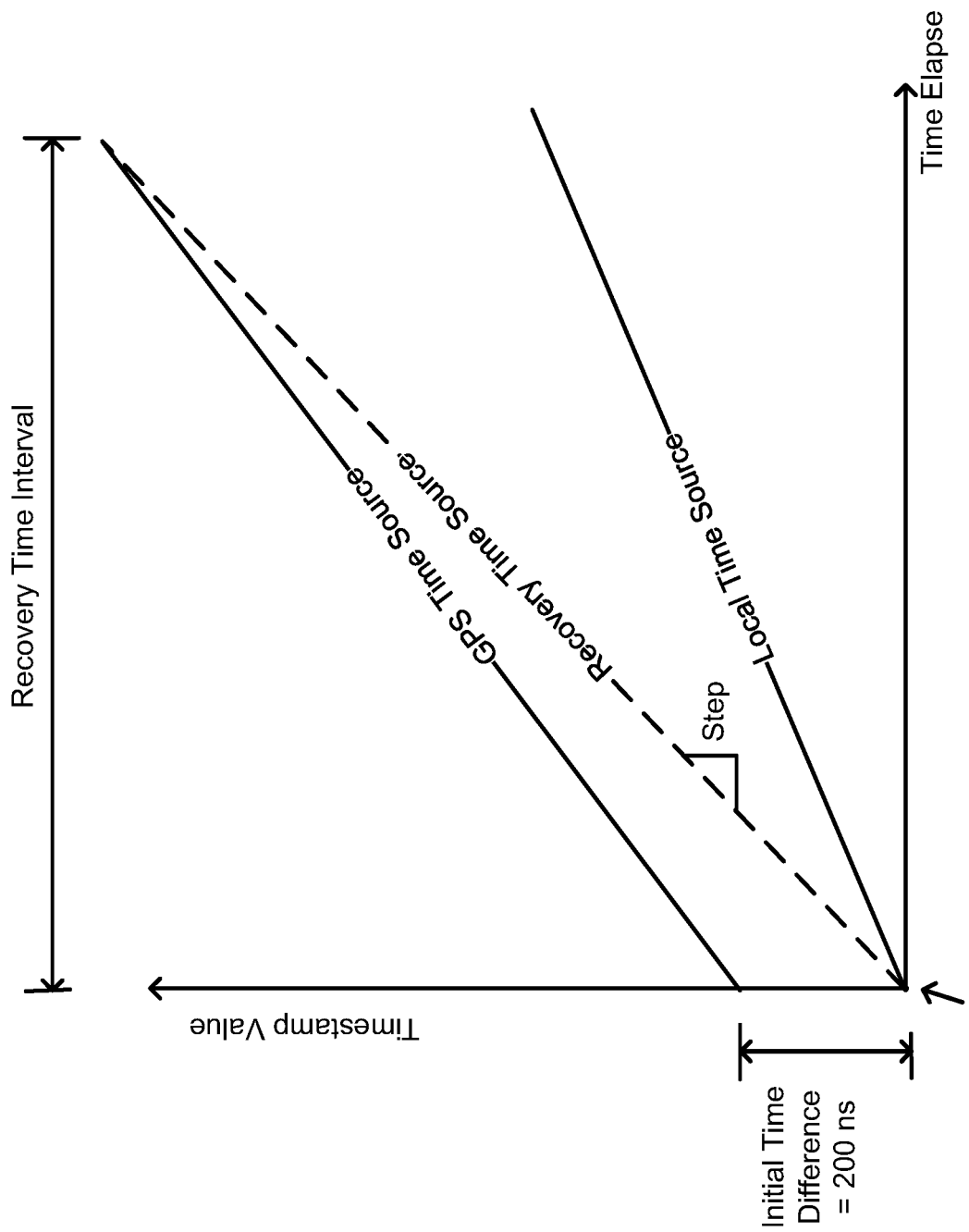
FIG. 15 is a time chart illustrating an example of a smooth time source recovery according to one embodiment.

FIG. 15 is a time chart illustrating an example of a smooth time source recovery according to one embodiment. Referring to FIG. 15, at time=0, when a GPS signal is detected to transition from unavailable to available (e.g., became available), an initial time difference is determined to be a lag of 200 nanoseconds (ns). The initial time difference is compared with a predetermined max limit (e.g., 500 ms) and is determined to be less than the max limit. In this case, because the initial time difference is determined to be less than the max limit, a smoothing logic is applied. Moreover, because the local time source lags the GPS time, the local time source is incrementally increased (according to a preconfigured step increment or a max increment interval) to catch up with the GPS time. In one embodiment, the increment step is predetermined based on a digital clock cycle time interval of the digital clock for the sensor unit. For example, the increment step can be 10 ns because the clock cycle of the sensor unit has a 10 ns time interval. In this case, for each digital clock cycles (e.g., 10 ns), the local time source increments time by the cycle interval plus the increment, e.g., 20 ns. After 20 digital clock cycles (or 200 ns), the local clock source would then be aligned with the GPS time. Note, the max limit of 500 ms with an increment step of 10 ns would provide a maximum time recovery period of 500 ms. Here, the increment step can be adjusted to speed up or slow down the smooth recovery time interval.

If the initial time difference is determined to be greater than 500 ms then the local time source is abruptly aligned to the GPS time without any smoothing logic. Note, adjusting the time source does not interfere with the local digital clock for sensor unit but only adjusts the timestamp clock source that provides the TX/RX and trigger timestamps for the one or more sensors of the sensor unit. Although 500 ms and 10 ns are described as the max limit and recovery increment/step respectively, any time intervals can be used as the max limit and time increment.

Figure 16:
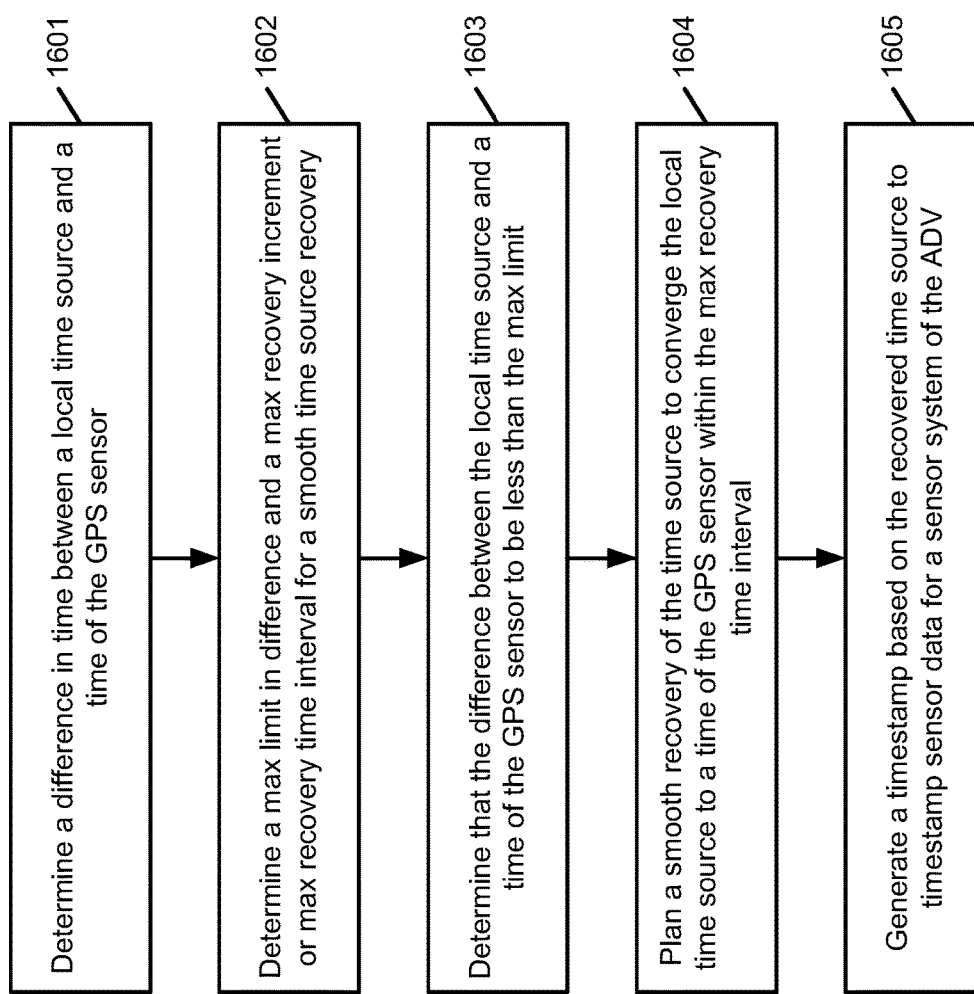
FIG. 16 is a flow diagram of a method to recover a time source according to one embodiment.

FIG. 16 is a flow diagram of a method to recover a time source according to one embodiment. Processing 1600 may be performed by processing logic which may include software, hardware, or a combination thereof. For example, process 1600 may be performed by time source recovery module 523 of FIG. 14. Referring to FIG. 16, at block 1601, processing logic determines a difference in time between a local time source and a time of a GPS sensor. At block 1602, processing logic determines a max limit in difference and a max recovery increment (e.g., step increment) or a max recovery time interval for a smooth time source recovery. At block 1603, processing logic determines that the difference between the local time source and a time of the GPS sensor to be less than the max limit. At block 1604, processing logic plans a smooth recovery of the time source to converge the local time source to a time of the GPS sensor within the max recovery time interval. At block 1605, processing logic generates a timestamp (RX/TX or trigger timestamp) based on the recovered time source to timestamp sensor data for a sensor unit of the ADV.

In one embodiment, processing logic further determines that the difference between the local time source and a time of the GPS sensor to be greater than the max limit. Processing logic then plans an abrupt recovery of the time source to assign the local time source to be a time of the GPS sensor. In one embodiment, processing logic further plans the smooth recovery of the time source to converge the local time source to a time of the GPS sensor based on a predetermined time increment different from the max recovery increment.

In one embodiment, the predetermined time increment (or step) is a single clock cycle interval for the sensor unit. In another embodiment, the single clock cycle interval is 10 nanoseconds. In one embodiment, the max limit and the recovery increment or max recovery time interval are preconfigured by a user. In one embodiment, the difference in time between a local time source and a time of the GPS sensor is determined upon detecting a signal recovery from the GPS sensor.

Figure 17:
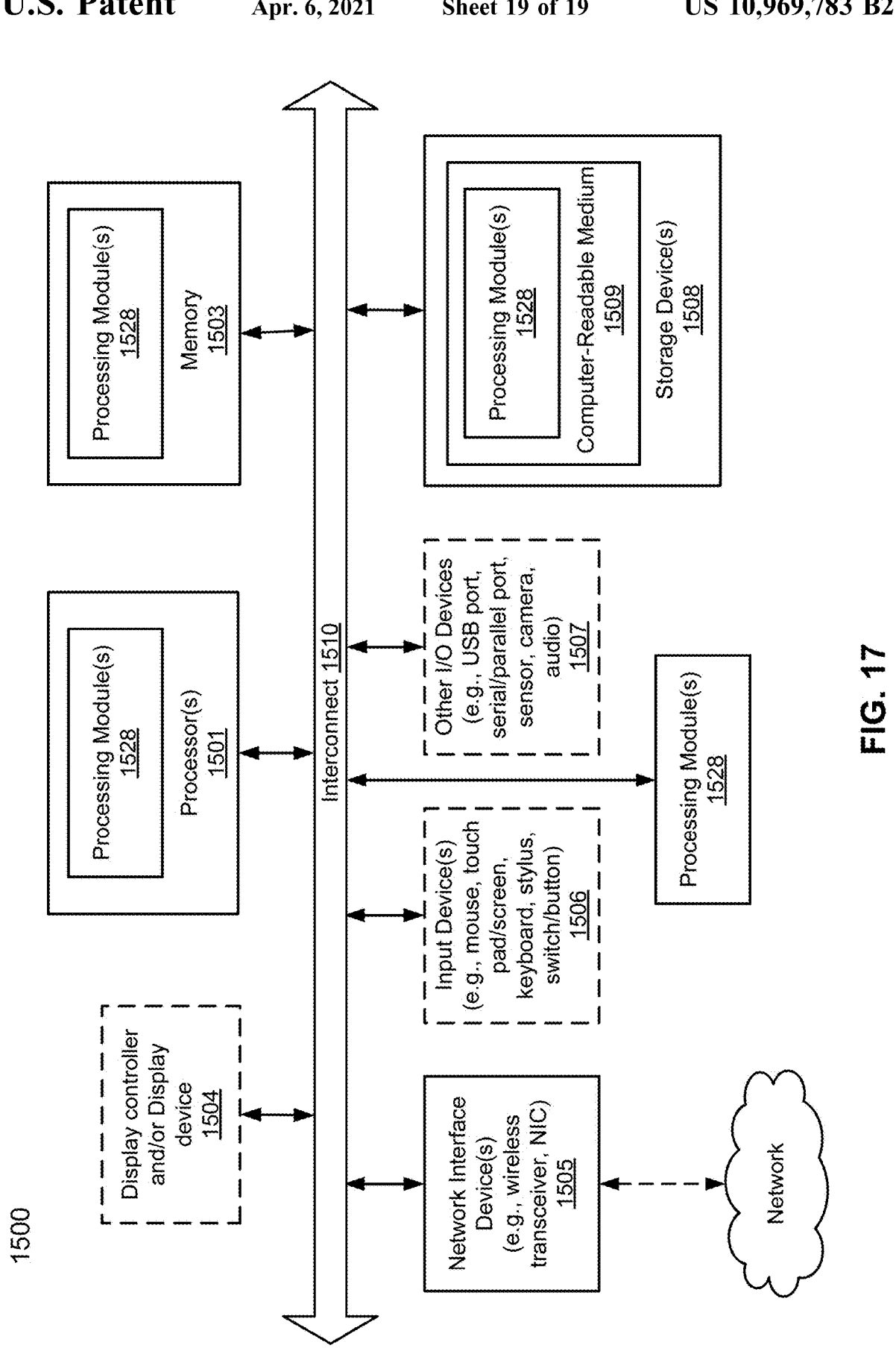
FIG. 17 is a block diagram illustrating a data processing system according to one embodiment.

FIG. 17 is a block diagram illustrating an example of a data processing system which may be used with one embodiment of the disclosure. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, perception module 302, planning module 305, control module 306, and/or sensor unit 500. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A method to rank time sources for an autonomous driving vehicle (ADV), the method comprising:
receiving a plurality of times from a plurality of time sources including a global positioning system (GPS) sensor, a plurality of sensors, and real-time clocks (RTCs), wherein the GPS sensor and the plurality of sensors are in communication with the ADV, and wherein the RTCs include at least a central processing unit real-time clock (CPU-RTC);
generating a difference histogram based on a time for each of the plurality of time sources for a difference in time between a time of the GPS sensor and a time for each of the plurality of sensors and the RTCs;
ranking the differences in time between the time of the GPS sensor and the time for each of the plurality of sensors and the RTCs based on the difference histogram;
selecting, based on the ranked differences in time, a time source from one of the plurality of sensors or the RTCs with a ranked difference in time that is less than a remainder of ranked differences in time of a remainder of the plurality of sensors and RTCs; and
generating a timestamp based on the selected time source to timestamp sensor data for a sensor unit of the ADV.

2. The method of claim 1, wherein the difference histogram includes an average difference histogram comprising an average time difference distribution for the GPS sensors and each of the plurality of sensors and the RTCs.

3. The method of claim 1, further comprising defaulting to a default list of ranking for the plurality of sensors or the RTCs when the difference histogram is unavailable.

4. The method of claim 1, further comprising:
storing time information of the CPU-RTC to a log file, the time information including a time difference between a time for the CPU-RTC and the time of the GPS sensor;
monitoring the time difference between the time for the CPU-RTC and the time of GPS sensor; and
updating the time information in the log file based on the monitored time difference.

5. The method of claim 1,
wherein the plurality of sensors comprise at least one of wireless receiver and a vehicle-to-everything (V2X) sensor, and
wherein the RTCs further comprise a field programmable gate array real-time clock (FPGA RTC).

6. The method of claim 1, further comprising logging the difference histogram and the ranking of the plurality of sensors and the RTCs to a log buffer.

7. A circuit to rank time sources for an autonomous driving vehicle (ADV), the circuit comprising:
a receiving processor to receive a plurality of times from a plurality of time sources including a global positioning system (GPS) sensor, a plurality of sensors, and real-time clocks (RTCs), wherein the GPS sensor and the plurality of sensors are in communication with the ADV, and wherein the RTCs include at least a central processing unit real-time clock (CPU-RTC);
a histogram generation processor coupled to the receiving processor, the histogram generation processor to generate a difference histogram based on a time for each of the plurality of time sources for a difference in time between a time of the GPS sensor and a time for each of the plurality of sensors and the RTCs;
a histogram ranking processor coupled to the histogram generation processor, the histogram ranking processor to rank the differences in time between the time of the GPS sensor and the time for each of the plurality of sensors and the RTCs based on the difference histogram;
a histogram selection processor coupled to the histogram ranking processor, the histogram selection processor to select, based on the ranked differences in time, a time source from one of the plurality of sensors or the RTCs with a difference in time that is less than a remainder of ranked differences in time of a remainder of the plurality of sensors and RTCs; and
a timestamp generation processor coupled to the histogram selection processor, the timestamp generation processor to generate a timestamp based on the selected time source to timestamp sensor data for a sensor unit of the ADV.

8. The circuit of claim 7, wherein the difference histogram includes an average difference histogram comprising an average time difference distribution for the GPS sensors and each of the plurality of sensors and the RTCs.

9. The circuit of claim 7, further comprising a default list of ranking for the plurality of sensors or the RTCs to be utilized when the difference histogram is unavailable.

10. The circuit of claim 7, further comprising a CPU-RTC monitoring processor coupled to the receiving processor, wherein the CPU-RTC monitoring processor performs the operations of:
storing time information of the CPU-RTC to a log file, the time information including a time difference between a time for the CPU-RTC and the time of the GPS sensor;
monitoring the time difference between the time for the CPU-RTC and the time of the GPS sensor; and
updating the time information in the log file based on the monitored time difference.

11. The circuit of claim 7,
wherein the plurality of sensors comprise at least one of a wireless receiver and a vehicle-to-everything (V2X) sensor, and
wherein the RTCs further comprise a field programmable gate array real-time clock (FPGA RTC).

12. The circuit of claim 7, further comprising a logging processor for logging the difference histogram and the ranking of the plurality of sensors and the RTCs to a log buffer.

13. A sensor unit for an autonomous driving vehicle (ADV), the sensor unit comprising:
a sensor interface to be coupled to a plurality of sensors mounted on a plurality of locations of the ADV; and
a time ranking circuit coupled to the sensor interface, the time ranking circuit comprises:
a receiving processor to receive a plurality of times from a plurality of time sources including a global positioning system (GPS) sensor, a plurality of sensors, and real-time clocks (RTCs), wherein the GPS sensor and the plurality of sensors are in communication with the ADV, and wherein the RTCs include at least a central processing unit real-time clock (CPU-RTC);
a histogram generation processor coupled to the receiving processor, the histogram generation processor to generate a difference histogram based on a time for each of the plurality of time sources for a difference in time between a time of the GPS sensor and a time for each of the plurality of sensors and the RTCs;
a histogram ranking processor coupled to the histogram generation processor, the histogram ranking processor to rank the differences in time between the time of the GPS sensor and the time for each of the plurality of sensors and the RTCs based on the difference histogram;
a histogram selection processor coupled to the histogram ranking processor, the histogram selection processor to select, based on the ranked differences in time, a time source from one of the plurality of sensors or the RTCs with a ranked difference in time that is less than a remainder of ranked differences in time of a remainder of the plurality of sensors and RTCs; and
a timestamp generation processor coupled to the histogram selection processor, the time stamp generation processor to generate a time stamp based on the selected time source to timestamp sensor data for the sensor unit of the ADV.

14. The sensor unit of claim 13, wherein the difference histogram includes an average difference histogram comprising an average time difference distribution for the GPS sensors and each of the plurality of sensors and the RTCs.

15. The sensor unit of claim 13, wherein the time ranking circuit further comprises a default list of ranking for the plurality of sensors or the RTCs to be utilized when the difference histogram is unavailable.

16. The sensor unit of claim 13, further comprising a CPU-RTC monitoring processor coupled to the receiving processor, wherein the CPU-RTC monitoring processor performs the operations of:
storing time information of the CPU-RTC to a log file, the time information including a time difference between a time for the CPU-RTC and the time of the GPS sensor;
monitoring the time difference between the time for the CPU-RTC and the time of the GPS sensor; and
updating the time information in the log file based on the monitored time difference.

17. The sensor unit of claim 13,
wherein the plurality of sensors comprise at least one of a wireless receiver and a vehicle-to-everything (V2X) sensor, and
wherein the RTCs further comprise a field programmable gate array real-time clock (FPGA RTC).

18. The sensor unit of claim 13, further comprising a logging processor for logging the difference histogram and the ranking of the plurality of sensors and the RTCs to a log buffer.

* * * * *